United States Patent [19]
Machida et al.

[11] Patent Number: 5,608,009
[45] Date of Patent: Mar. 4, 1997

[54] OLEFIN COPOLYMER AND PROCESS FOR PREPARING SAME

[75] Inventors: Shuji Machida; Haruo Shikuma; Toshinori Tazaki; Tomio Tatsumi; Shinichi Kurokawa, all of Kamiizumi Sodegaura, Japan

[73] Assignee: Idemitsu Kosan Co., Ltd., Tokyo, Japan

[21] Appl. No.: 424,384

[22] PCT Filed: Oct. 28, 1993

[86] PCT No.: PCT/JP93/01556

§ 371 Date: Apr. 28, 1995

§ 102(e) Date: Apr. 28, 1995

[87] PCT Pub. No.: WO94/10216

PCT Pub. Date: May 11, 1994

[30] Foreign Application Priority Data

Oct. 28, 1992 [JP] Japan ..................... 4-290386
May 28, 1993 [JP] Japan ..................... 5-127154

[51] Int. Cl.$^6$ ............... C08F 255/02; C08F 255/08; C08F 279/02
[52] U.S. Cl. ............... 525/247; 525/242; 525/245; 525/268; 525/270; 525/313; 525/315; 525/316; 525/319; 525/322; 525/324
[58] Field of Search ............... 525/245, 547, 525/313, 315, 316, 319, 270, 322, 324; 526/335, 336

[56] References Cited

U.S. PATENT DOCUMENTS

| | | |
|---|---|---|
| 4,049,893 | 9/1977 | Kidwell, Jr. . |
| 4,303,756 | 12/1981 | Kajimura et al. . |
| 5,017,665 | 5/1991 | Chang ..................... 526/129 |
| 5,250,629 | 10/1993 | Tani et al. ............... 525/268 |
| 5,262,503 | 11/1993 | Gotoh ..................... 526/336 |

FOREIGN PATENT DOCUMENTS

| | | |
|---|---|---|
| 0339986 | 11/1989 | European Pat. Off. . |
| 0366411 | 5/1990 | European Pat. Off. . |
| 0421659 | 4/1991 | European Pat. Off. . |
| 0505973 | 9/1992 | European Pat. Off. . |
| 0509396 | 10/1992 | European Pat. Off. . |
| 2027831 | 1/1971 | Germany . |
| 2030641 | 1/1971 | Germany . |
| WO91/18030 | 11/1991 | WIPO . |

*Primary Examiner*—David W. Wu
*Attorney, Agent, or Firm*—Oblon, Spivak, McClelland, Maier & Neustadt, P.C.

[57] ABSTRACT

There are herein disclosed an olefin copolymer which comprises an olefin unit and a diolefin unit and in which a weight-average molecular weight is in the range of 200 to 800,000, the content of the diolefin unit is in the range of 0.002 to 30 mol%, and a ratio TUS/DOU between the total content of unsaturated groups observed in a molecular chain (TUS mol%) and the content of the diolefin unit (DOU mol%) is in the range of 0.001 to 200; an olefin graft copolymer obtained by the graft polymerization of this olefin copolymer and an olefin; a hydrogenated olefin copolymer and olefin graft copolymer thereof; and a process for preparing these copolymers.

These olefin copolymers are excellent in molding/working properties and have a good thermal stability, transparency and uniformity. Therefore, they are useful as a high-performance VLDPE, LDPE, L-LDPE and HDPE, and further useful as a novel branched propylene polymer, a thermoplastic elastomer, a compatibilizing agent for other resins, and the like.

9 Claims, No Drawings

OLEFIN COPOLYMER AND PROCESS FOR PREPARING SAME

TECHNICAL FIELD

The present invention relates to an olefin polymer and a process for preparing the same. More specifically, the present invention relates to an olefin copolymer and an olefin graft copolymer having transparency and uniformity which can optionally control the activation energy of the fluidization of a melt and in which high-speed molding is possible to lower a working cost, hydrogenated copolymers thereof having an excellent thermal stability, and a process for efficiently preparing these copolymers.

BACKGROUND ART

Heretofore, olefin (co)polymers have widely been used as general-purpose resins in many fields, but among these olefin (co)polymers, ethylene (co)polymers have the following problems and thus their improvement has been strongly desired. For example, in a linear low-density polyethylene (L-LDPE) and a high-density polyethylene (HDPE), the activation energy of fluidization in a melting state is small, so that they are poorer in moldability as compared with a low-density polyethylene (LDPE), and in particular, a high-molecular weight compound has a substantial problem that its moldability is poor. Furthermore, the ethylene (co)polymer has the problem of neck-in at the time of the molding of sheets and films, and moreover, the linear low-density polyethylene has a problem that transparency and heat-sealing properties are poor.

As a method for solving such a problem, for example, there has been disclosed an olefin copolymer having long-chain branches obtained by using an $\alpha,\omega$-diene compound and a cyclic endomethylene diene compound (Japanese Patent Application Laid-open No. 34981/1972). However, in this olefin copolymer, a diene component is concerned with the long-chain branches and a crosslinking reaction simultaneously occurs, and a gel is generated at the time of film molding. In addition, melt properties inversely deteriorate, and a control range is extremely limited. Moreover, a copolymerization reactivity is also low, and owing to the formation of low-molecular weight compounds, physical properties inconveniently deteriorate.

Furthermore, another preparation method has been disclosed which is characterized in that when a non-conjugated diene compound is copolymerized with an olefin, the polymerization is carried out in two steps, and the content of a non-conjugated diene compound unit in a high-molecular weight portion is higher than that of the non-conjugated diene compound unit in a low-molecular weight portion (Japanese Patent Application Laid-open No. 56412/1984). However, in this method, a long-chain branch is introduced into a high-molecular weight component, and therefore the increase in the molecular weight due to crosslinking is noticeable. In consequence, insolubilization, nonfusion and gelation simultaneously occur with a high probability, and a control range is narrow and a copolymerization reactivity is also low, so that physical properties inconveniently deteriorate owing to the formation of the low-molecular weight compound.

In addition, an ethylene-$\alpha$-olefin-1,5-hexadiene copolymer obtained by the use of a metallocene-aluminoxane catalyst has been disclosed (Japanese Patent Application Disclosure No. 501555/1989). However, in this copolymer, a molecular-weight distribution is narrow, which is disadvantageous to blow molding and film formation, and the copolymer is inconveniently devoid of thermal stability.

Moreover, also with regard to a propylene polymer, a resin design has been made to sufficiently utilize characteristics peculiar to the propylene polymer by imparting novel characteristics (particularly melt tension), with the intention of achieving the wider application of the propylene polymer. For example, in Japanese Patent Application Laid-open Nos. 185490/1993, 194659/1993, 194778/1993, 194793/1993, 200849/1993, 202137/1993, 202143/1993, 202219/1993, 202237/1993, 202238/1993, 202248/1993, 209062/1993, 212771/1993, 212774/1993, 214178/1993, 220829/1993, 222121/1993, 222122/1993, 222251/1993, 228995/1993, 237930/1993 and 239232/1993, there have been disclosed techniques of imparting the sufficiently improved melt tension to a propylene polymer and a resin composition containing this polymer by combining a preliminary polymerization catalyst with a preliminary polymerization method. However, in the techniques disclosed in these publications, the preliminary polymerization operation which is carried out prior to a main polymerization comprises at least 3 steps, and so the operation is intricate. Besides, its reactivity is usually poor, and a chain non-conjugated diene which might bring about cyclization and a crosslinking reaction during the reaction is inconveniently used.

DISCLOSURE OF THE INVENTION

Under such circumstances, the present invention has been made for the purpose of providing an olefin copolymer having excellent thermal stability, transparency and uniformity which can optionally control the activation energy of the fluidization of a melt and in which high-speed molding is possible to lower a working cost, and a process for efficiently preparing this copolymer.

The present inventors have intensively researched with the intention of accomplishing the above-mentioned object, and as a result, it has been found that an olefin copolymer comprising a unit derived from an olefin and a unit derived from a diolefin, having a specific weight-average molecular weight and a specific content of the unit derived from the diolefin, and having a specific relation between the content of the unit derived from the diolefin and a content of unsaturated groups in a molecular chain as well as an olefin graft copolymer obtained by the graft polymerization of this copolymer and an olefin has the above-mentioned preferable characteristics, and it has also been found that these copolymers can efficiently be prepared by the use of a specific polymerization catalyst. Furthermore, it has be found that substantially unsaturated group-free polymers which can be obtained by hydrogenating the olefin copolymer and the olefin graft copolymer have not only the above-mentioned preferable characteristics but also an excellent thermal stability. The present invention has been completed on the basis of such a knowledge.

That is to say, the present invention provides (I) an olefin copolymer which comprises a unit derived from an olefin and a unit derived from a diolefin and in which a weight-average molecular weight is in the range of 200 to 800,000, the content of the unit derived from the diolefin is in the range of 0.002 to 30 mol%, and a relation between the content of the unit derived from the diolefin (DOU mol%) and the total content of unsaturated groups observed in a molecular chain (TUS mol%) meets the formula $$0.001 \leq TUS/DOU \leq 200,$$

(II) an olefin graft copolymer prepared by the graft polymerization of this olefin copolymer and an olefin, (III) a substantially unsaturated group-free olefin polymer prepared by hydrogenating the olefin copolymer, and (IV) a substantially unsaturated group-free olefin graft polymer prepared by hydrogenating the olefin graft copolymer.

Furthermore, the present invention provides (I) a process for preparing the above-mentioned olefin copolymer which comprises the step of copolymerizing an olefin and a diolefin in the presence of a polymerization catalyst containing, as main components, (A) a transition metal compound and (B) a compound capable of reacting with the transition metal compound of the component (A) or its derivative to form an ionic complex, (II) a process for preparing the above-mentioned olefin graft copolymer which comprises the steps of copolymerizing an olefin and a diolefin in the presence of a polymerization catalyst containing, as main components, (A) a transition metal compound and (B) a compound capable of reacting with the transition metal compound of the component (A) or its derivative to form an ionic complex, whereby an olefin copolymer is formed, and then further graft-polymerizing the copolymer and an olefin in the presence of the above-mentioned polymerization catalyst, (III) a process for preparing the above-mentioned olefin copolymer which comprises the step of hydrogenating, in the presence of a hydrogenation catalyst, the olefin copolymer (I) obtained by the above-mentioned process, and (IV) a process for preparing the above-mentioned olefin graft copolymer which comprises the step of hydrogenating, in the presence of a hydrogenation catalyst, the olefin graft copolymer (II) obtained by the above-mentioned process.

BEST MODE FOR CARRYING OUT THE INVENTION

For an olefin copolymer (I) and an olefin graft copolymer (II) of the present invention, olefins and diolefins are used as material monomers. As the olefins, there can be used ethylene, α-olefins having 3 to 20 carbon atoms, aromatic vinyl compounds and cyclic olefins. Examples of the α-olefins having 3 to 20 carbon atoms include propylene, 1-butene, 1-pentene, 4-methyl-1-pentene, 1-hexene, 1-octene, 1-decene, 1-dodecene, 1-tetradecene, 1-hexadecene, 1-octadecene and 1-eicosene. Furthermore, the aromatic vinyl compounds include styrene and its derivatives (which have substituents containing carbon, halogens, silicon and the like), and typical examples of the aromatic vinyl compounds include styrene, alkylstyrenes such as p-methylstyrene, o-methylstyrene, m-methylstyrene, 2,4-dimethylstyrene, 2,5-dimethylstyrene, 3,4-dimethylstyrene, 3,5-dimethylstyrene and p-t-butylstyrene, halogenated styrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene and o-methyl-p-fluorostyrene, and vinylbiphenyls such as 4-vinylbiphenyl, 3-vinylbiphenyl and 2-vinylbiphenyl. Moreover, the cyclic olefins preferably have 3 to 20 carbon atoms, and typical examples of the cyclic olefins include cyclopentene, cyclohexene, norbornene, 1-methylnorbornene, 5-methylnorbornene, 7-methylnorbornene, 5,6-dimethylnorbornene, 5,5,6-trimethylnorbornene, 5-ethylnorbornene, 5-propylnorbornene, 5-phenylnorbornene and 5-benzylnorbornene.

In the present invention, these olefins may be used singly or in a combination of two or more thereof.

On the other hand, as the diolefins, there can preferably be used polyfunctional monomers selected from cyclic diene compounds and compounds obtained from at least two similar or different kinds of residues selected from the group consisting of an α-olefin residue, a styrene residue and a cyclic olefin residue. Examples of such polyfunctional monomers include straight-chain or branched acyclic diene compounds, monocyclic alicyclic diene compounds, polycyclic alicyclic diene compounds, cycloalkenyl-substituted alkenes, diene compounds having aromatic rings, and diene compounds having the α-olefin residue and the styrene residue in one molecule.

Examples of the straight-chain or branched acyclic diene compounds include 1,4-pentadiene, 1,4-hexadiene, 1,5-hexadiene, 1,6-octadiene, 1,7-octadiene, 1,9-decadiene, 1,11-dodecadiene, 2-methyl-1,4-pentadiene, 2-methyl-1,5-hexadiene and 3-ethyl-1,7-octadiene, and examples of the monocyclic alicyclic diene compounds include 1,3-cyclopentadiene, 1,4-cyclohexadiene, 1,5-cyclooctadiene, 1,5-cyclododecadiene, 1,2-divinylcyclohexane and 1,3-divinylcyclohexane.

Moreover, examples of the polycyclic alicyclic diene compounds include dicyclopentadiene, norbornadiene, tetrahydroindene, methyltetrahydroindene, bicyclo-(2,2,1)-hepta-2,5-diene, 5-methyl-2,5-norbornadiene, and norbornenes of alkenyl, alkylidene, cycloalkenyl and cycloalkylidene, for example, 5-methyl-2-norbornene, 5-ethylidene-2-norbornene, 5-isopropylidene-2-norbornene, 5-vinylnorbornene, 5-butenylnorbornene, 5-(4-cyclopentenyl)-2-norbornene, 5-cyclohexylidene-2-norbornene, and compounds represented by the formulae

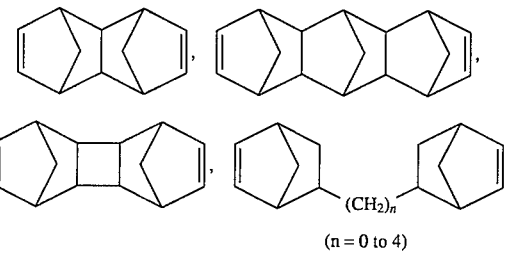

(n = 0 to 4)

Furthermore, examples of the cycloalkenyl-substituted alkenes include allylcyclohexene, vinylcyclooctene, allylcyclodecene and vinylcyclododecene, and examples of the diene compounds having the aromatic rings include p-divinylbenzene, m-divinylbenzene, o-divinylbenzene, di-(p-vinylphenyl)methane, 1,3-bis(p-vinylphenyl)propane and 1,5-bis(p-biphenyl)pentane.

On the other hand, examples of the diene compounds having the α-olefin residue and the styrene residue in one molecule include p-(2-propenyl)styrene, m-(2-propenyl)styrene, p-(3-butenyl)styrene, m-(3-butenyl)styrene, o-(3-butenyl)styrene, p-(4-pentenyl)styrene, m-(4-pentyl)styrene, o-(4-pentenyl)styrene, p-(7-octenyl)styrene, p-(1-methyl-3-butenyl)styrene, p-(2-methyl-3-butenyl)styrene, m-(2-methyl-3-butenyl)styrene, o-(2-methyl-3-butenyl)styrene, p-(3-methyl-3-butenyl)styrene, p-(2-ethyl-4-pentenyl)styrene, p-(3-butenyl)-α-methylstyrene, m-(3-butenyl-α-methylstyrene, o-(3-butenyl)-α-methylstyrene, 4-vinyl-4'-(3-butenyl)biphenyl, 4-vinyl-3'-(3-butenyl)biphenyl, 4-vinyl-4'-(4-pentenyl)biphenyl, 4-vinyl-2'-(4-pentenyl)biphenyl and 4-vinyl-4'-(2-methyl-3-butenyl)biphenyl.

These diolefins may be used singly or in a combination of two or more thereof.

In the preparation of the olefin copolymer (I) and the olefin graft copolymer (II) of the present invention, it is preferable to use a polymerization catalyst containing, as main components, (A) a transition metal compound and (B) a compound capable of reacting with the transition metal compound of the component (A) or its derivative to form an ionic complex.

As the transition metal compound of the component (A), there can be used a transition metal compound containing a metal in the groups III to X of the periodic table or a metal of a lanthanide series. Typical preferable examples of the transition metal include titanium, zirconium, hafnium, chromium, manganese, nickel, palladium and platinum, and particularly preferable are zirconium, hafnium, titanium, nickel and palladium.

Such a transition metal compound includes various kinds of compounds, but in particular, compounds containing transition metals in the groups IV and VIII to X, above all, compounds containing transition metals selected from the group IV of the periodic table, i.e., titanium, zirconium and hafnium can be suitably used. Particularly suitable are compounds represented by the general formulae $$CpM^1R^1{}_aR^2{}_bR^3{}_c \qquad (I)$$

$$Cp_2M^1R^1{}_aR^2{}_b \qquad (II)$$

$$(Cp-A_e-Cp)M^1R^1{}_aR^2{}_b \qquad (III)$$

or the general formula $$M^1R^1{}_aR^2{}_bR^3{}_cR^4{}_d \qquad (IV)$$

and their derivatives.

In the above-mentioned general formulae (I) to (IV), $M^1$ represents a transition metal such as titanium, zirconium or hafnium in the group Iv of the periodic table, and Cp represents a cyclic unsaturated hydrocarbon group or a chain unsaturated hydrocarbon group such as a cyclopentadienyl group, a substituted cyclopentadienyl group, an indenyl group, a substituted indenyl group, a tetrahydroindenyl group, a substituted tetrahydroindenyl group, a fluorenyl group or a substituted fluorenyl group. $R^1$, $R^2$, $R^3$ and $R^4$ each independently represents a σ-bond ligand, a chelate ligand or a ligand such as a Lewis base, and typical examples of the σ-bond ligand include a hydrogen atom, an oxygen atom, a halogen atom, an alkyl group having 1 to 20 carbon atoms, an alkoxy group having 1 to 20 carbon atoms, an aryl group, an alkylaryl group or an arylalkyl group having 6 to 20 carbon atoms, an acyloxy group having 1 to 20 carbon atoms, an allyl group, a substituted allyl group, and a substituent containing a silicon atom. In addition, examples of the chelate ligand include an acetylacetonato group and a substituted acetylacetonato group. A represents a crosslinkage by a covalent bond. a, b, c and d each is independently an integer of 0 to 4, and e is an integer of 0 to 6. Two or more of $R^1$, $R^2$, $R^3$ and $R^4$ may bond to each other to form a ring. In the case that the above-mentioned Cp has a substituent, this substituent is preferably an alkyl group having 1 to 20 carbon atoms. In the formulae (II) and (III), the two Cps may be the same or different from each other.

Examples of the substituted cyclopentadienyl group in the above-mentioned formulae (I) to (III) include a methylcyclopentadienyl group, an ethylcyclopentadienyl group, an isopropylcyclopentadienyl group, a 1,2-dimethylcyclopentadienyl group, a tetramethylcyclopentadienyl group, a 1,3-dimethylcyclopentadienyl group, a 1,2,3-trimethylcyclopentadienyl group, a 1,2,4-trimethylcyclopentadienyl group, a pentamethylcyclopentadienyl group and a trimethylsilylcyclopentadienyl group. Furthermore, typical examples of $R^1$ to $R^4$ in the above-mentioned formulae (I) to (IV) include a fluorine atom, a chlorine atom, a bromine atom and an iodine atom as the halogen atoms; a methyl group, an ethyl group, an n-propyl group, an isopropyl group, an n-butyl group, an octyl group and a 2-ethylhexyl group as the alkyl groups having 1 to 20 carbon atoms; a methoxy group, an ethoxy group, a propoxy group, a butoxy group and a phenoxy group as the alkoxy groups having 1 to 20 carbon atoms; a phenyl group, a tolyl group, a xylyl group and a benzyl group as the aryl groups, the alkylaryl groups or the arylalkyl groups having 6 to 20 carbon atoms; a heptadecylcarbonyloxy group as the acyloxy group having 1 to 20 carbon atoms; a trimethylsilyl group and a (trimethylsilyl)methyl group as the substituent containing a silicon atom; and ethers such as dimethyl ether, diethyl ether and tetrahydrofuran, a thioether such as tetrahydrothiophene, an ester such as ethyl benzoate, nitriles such as acetonitrile and benzonitrile, amines such as trimethylamine, triethylamine, tributylamine, N,N-dimethylaniline, pyridine, 2,2'-bipyridine and phenanthroline, phosphines such as triethylphosphine and triphenylphosphine, chain unsaturated hydrocarbons such as ethylene, butadiene, 1-pentene, isoprene, pentadiene, 1-hexene and their derivatives, and cyclic unsaturated hydrocarbons such as benzene, toluene, xylene, cycloheptatriene, cyclooctadiene, cyclooctatriene, cyclooctatetraene and their derivatives as the Lewis base. In addition, examples of the crosslinkage by the covalent bond of A in the formula (III) include a methylene crosslinkage, a dimethylmethylene crosslinkage, an ethylene crosslinkage, a 1,1'-cyclohexylene crosslinkage, a dimethylsilylene crosslinkage, a dimethylgermilene crosslinkage and a dimethylstanilene crosslinkage.

Examples of the compound represented by the general formula (I) include (pentamethylcyclopentadienyl)trimethylzirconium, (pentamethylcyclopentadienyl)triphenylzirconium, (pentamethylcyclopentadienyl)tribenzylzirconium, (pentamethylcyclopentadienyl)trichlorozirconium, (pentamethylcyclopentadienyl)trimethoxyzirconium, (cyclopentadienyl)trimethylzirconium, (cyclopentadienyl)triphenylzirconium, (cyclopentadienyl)tribenzylzirconium, (cyclopentadienyl)trichlorozirconium, (cyclopentadienyl)trimethoxyzirconium, (cyclopentadienyl)dimethyl(methoxy)zirconium, (methylcyclopentadienyl)trimethylzirconium, (methylcyclopentadienyl)triphenylzirconium, (methylcyclopentadienyl)tribenzylzirconium, (methylcyclopentadienyl)trichlorozirconium, (methylcyclopentadienyl)dimethyl(methoxy)zirconium, (dimethylcyclopentadienyl)trichlorozirconium, (trimethylcyclopentadienyl)trichlorozirconium, (trimethylcyclopentadienyl)trimethylzirconium, (tetramethylcyclopentadienyl)trichlorozirconium, and these compounds in which zirconium is replaced with titanium or hafnium.

Examples of the compound represented by the general formulae (II) include bis(cyclopentadienyl)dimethylzirconium, bis(cyclopentadienyl)diphenylzirconium, bis(cyclopentadienyl)diethylzirconium, bis(cyclopentadienyl)dibenzylzirconium, bis(cyclopentadienyl)dimethoxyzirconium, bis(cyclopentadienyl)dichlorozirconium, bis(cyclopentadienyl)dihydridozirconium, bis(cyclopentadienyl)monochloromonohydridozirconium, bis(methylcyclopentadienyl)dimethylzirconium, bis(methylcyclopentadienyl)dichlorozirconium, bis(methylcyclopentadienyl)dibenzylzirconium, bis(pentamethylcyclopentadienyl)dimethylzirconium, bis(pentamethylcyclopentadienyl)dichlorozirconium,
bis(pentamethylcyclopentadienyl)dibenzylzirconium,
bis(pentamethylcyclopentadienyl)chloromethylzirconium,
bis(pentamethylcyclopentadienyl) hydridomethylzirconium,
(cyclopentadienyl)(pentamethyl-cyclopentadienyl)dichlorozirconium, and these compounds in which zirconium is replaced with titanium or hafnium.

Furthermore, examples of the compound represented by the general formula (III) include ethylenebis(indenyl)dimethylzirconium, ethylenebis(indenyl)dichlorozirconium, ethylenebis(tetrahydroindenyl)dimethylzirconium, ethylenebis(tetrahydroindenyl)dichlorozirconium, dimethylsilylenebis(cyloropentadienyl)dimethylzirconium, dimethylsilylenebis(cyloropentadienyl)dichlorozirconium, isopropylidene(cyloropentadienyl)(9-fluorenyl)dimethylzirconium, isopropylidene(cyloropentadienyl)(9-fluorenyl)dichlorozirconium, [phenyl(methyl)methylene](9-fluorenyl)(cycylopentadienyl)dimethylzirconium, diphenylmethylene(cyclopentadienyl)(9-fluorenyl)dimethylzirconium, ethylene(-9fluorenyl)(cyclopentadienyl)dimethylzirconium, cyclohexalidene(9-fluorenyl)(cyclopentadienyl)dimethylzirconium, cyclopentylidene(9-fluorenyl)(cyclopentadienyl)dimethylzirconium, cyclobutylidene(9-fluorenyl)(cyclopentadienyl)dimethylzirconium, dimethylsilylene(9-fluorenyl)(cyclopentadienyl)dimethylzirconium, dimethylsilylenebis(2,3,5-trimethylcyclopentadienyl)dichlorozirconium, dimethylsilylenebis(2,3,5-trimethylcyclopentadienyl)dimethylzirconium, dimethylsilylenebis(indenyl)dichlorozirconium, and these compounds in which zirconium is replaced with titanium or hafnium.

Moreover, examples of the compound represented by the general formula (IV) include tetramethylzirconium, tetrabenzylzirconium, tetramethoxyzirconium, tetraethoxyzirconium, tetrabutoxyzirconium, tetrachlorozirconium, tetrabromozirconium, butoxytrichlorozirconium, dibutoxydichlorozirconium, bis(2,5-di-t-butylphenoxy)dimethylzirconium, bis(2,5-di-t-butylphenoxy)dichlorozirconium, zirconium bis(acetylacetonato), and these compounds in which zirconium is replaced with titanium or hafnium.

Furthermore, as the component (A), there can suitably be used a group IV transition compound having, as the ligand, a multiple ligand compound in which in the above-mentioned general formula (III), two substituted or unsubstituted conjugated cyclopentadienyl groups (however, at least one of which is a substituted cyclopentadienyl group) is bonded to each other via an element selected from the group XIV of the periodic table.

An example of such a compound is a compound represented by the general formula (V)

 (V)

or its derivative.

In the above-mentioned general formula (V), $Y^1$ represents a carbon atom, a silicon atom, a germanium atom or a tin atom, $R^5_t$—$C_5H_{4-t}$ and $R^5_u$—$C_5H_{4-u}$ each represents a substituted cyclopentadienyl group, and t and u each are an integer of 1 to 4. Here, $R^5$s each represents a hydrogen atom, a silyl group or a hydrocarbon group, and they may be the same or different from each other. In at least either of the cyclopentadienyl groups, $R^5$ is present on at least either of carbon atoms adjacent to the carbon atom bonded to $Y^1$. $R^6$ represents a hydrogen atom, an alkyl group having 1 to 20 carbon atoms, or an aryl group, an alkylaryl group or an arylalkyl group having 6 to 20 carbon atoms. $M^2$ represents a titanium atom, a zirconium atom or a hafnium atom, $X^1$ represents a hydrogen atom, a halogen atom, an alkyl group having 1 to 20 carbon atoms, an aryl group, an alkylaryl group or an arylalkyl group having 6 to 20 carbon atoms, or an alkoxy group having 1 to 20 carbon atoms. $X^1$ may be the same or different from each other, and similarly, $R^6$ is may be the same or different from each other.

Moreover, examples of the substituted cyclopentadienyl group in the general formula (V) include a methylcyclopentadienyl group, a ethylcyclopentadienyl group, an isopropylcyclopentadienyl group, a 1,2-dimethylcyclopentadienyl group, a 1,3-dimethylcyclopentadienyl group, a 1,2,3-trimethylcyclopentadienyl group and a 1,2,4-trimethylcyclopentadienyl group. Typical examples of $X^1$ include F, Cl, Br and I as the halogen atoms; a methyl group, an ethyl group, an n-propyl group, an isopropyl group, an n-butyl group, an octyl group and a 2-ethylhexyl group as the alkyl group having 1 to 20 carbon atoms; a methoxy group, an ethoxy group, a propoxy group, a butoxy group and a phenoxy group as the alkoxy groups having 1 to 20 carbon atoms; and a phenyl group, a tolyl group, a xylyl group and a benzyl group as the aryl group, the alkylaryl group or the arylalkyl group having 6 to 20 carbon atoms. Typical examples of the $R^6$ include a methyl group, an ethyl group, a phenyl group, a tolyl group, a xylyl group and a benzyl group.

Examples of the compound having the general formula (V) include dimethylsilylenebis(2,3,5-trimethylcyclopentadienyl)zirconium dichloride and this compound in which zirconium is replaced with titanium or hafnium.

In addition, the compound having the general formula (V) also includes compounds represented by the general formula (VI):

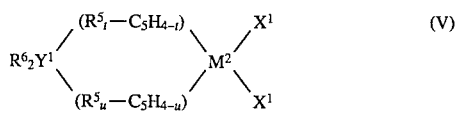 (VI)

In the compound of the general formula (VI), Cp represents a cyclic unsaturated hydrocarbon group or a chain unsaturated hydrocarbon group such as a cyclopentadienyl group, a substituted cyclopentadienyl group, an indenyl group, a substituted indenyl group, a tetrahydroindenyl group, a substituted tetrahydroindenyl group, a fluorenyl group or a substituted fluorenyl group. $M^3$ represents a titanium atom, a zirconium atom or a hafnium atom, $X^2$ represents a hydrogen atom, a halogen atom, an alkyl group having 1 to 20 carbon atoms, an aryl group, an alkylaryl group or an arylalkyl group having 6 to 20 carbon atoms, or an alkoxy group having 1 to 20 carbon atoms. Z represents $SIR^7_2$, $CR^7_2$, $SiR^7_2SiR^7_2$, $CR^7_2CR^{72}$, $CR^7_2CR^7_2CR^7_2$, $CR^7=CR^7$, $CR^7_2SiR^7_2$ or $GeR^7_2$, and $Y^2$ represents —$N(R^8)$—, —O—, —S— or —$P(R^8)$—. The above-mentioned $R^7$ is a group selected from the group consisting of a hydrogen atom, an alkyl group having 20 or less non-hydrogen atoms, an aryl group, a silyl group, a halogenated alkyl group, a halogenated aryl group and a combination thereof, and $R^8$ is an alkyl group having 1 to 10 carbon atoms or an aryl group having 6 to 10 carbon atoms, or $R^8$ may form a condensed ring of one or more $R^7$s and 30 or less non-hydrogen atoms. Moreover, w represents 1 or 2.

Typical examples of the compound represented by the general formula (VI) include (tert-butylamido)(tetramethyl-$\eta^5$-cyclopentadienyl)-1,2-ethanediylzirconium dichloride, (tert-butylamido)(tetramethyl-$\eta^5$-cyclopentadienyl)-1,2-ethanediyltitanium dichloride, (methylamido)(tetramethyl-$\eta^5$-cyclopentadienyl)-1,2-ethanediylzirconium dichloride, (methylamido) (tetramethyl-$\eta^5$-cyclopentadienyl)-1,2-ethanediyltitanium dichloride, (ethylamido)(tetramethyl-$\eta^5$-cyclopentadienyl)-methylenetitanium dichloride, (tert-butylamido)dimethyl(tetramethyl-$\eta^5$-cyclopentadienyl)silanetitanium dichloride, (tert-butylamido)dimethyl-(tetramethyl-$\eta^5$-cyclopentadienyl)silanezirconium dibenzyl, (benzylamido)dimethyl(tetramethyl-$\eta^5$-cyclopentadienyl)silanetitanium dichloride and (phenylphosphide)dimethyl-(tetramethyl-$\eta^5$-cyclopentadienyl)silanezirconium dibenzyl.

No particular restriction is put on transition metal compounds containing transition metals in the groups V to X, and typical examples of the chromium compound include tetramethylchromium, tetra(t-butoxy)chromium, bis(cyclopentadienyl)chromium, hydridotricarbonyl(cyclopentadienyl)chromium, hexacarbonyl(cyclopentadienyl)chromium, bis(benzene)chromium, tricarbonyltris(triphenyl phosphonate)chromium, tris(allyl)chromium, triphenyltris(tetrahydrofuran)chromium and chromium tris(acetyl-acetonato).

Typical examples of the manganese compounds include tricarbonyl(cyclopentadienyl)manganese, pentacarbonylmethylmanganese, bis(cyclopentadienyl)manganese and manganese bis(acetylacetonato).

Typical examples of the nickel compound include dicarbonylbis(triphenylphosphine)nickel, dibromobis(triphenylphosphine)nickel, dinitrogenbis[bis(tricyclohexylphosphine)nickel], chlorohydridobis(tricyclohexylphosphine)nickel, chloro(phenyl)bis(triphenylphosphine)nickel, dimethylbis(trimethylphosphine)nickel, diethyl(2,2'-bipyridyl)nickel, bis(allyl)nickel, bis(cyclopentadienyl)nickel, bis(methylcyclopentadienyl)nickel, bis(pentamethyl-cyclopentadienyl)nickel, allyl(cyclopentadienyl)nickel, (cyclopentadienyl)(cyclooctadiene)nickel tetrafluoroborate, bis(cyclooctadiene)nickel, nickel bisacetylacetonato, allylnickel chloride, tetrakis(triphenylphosphine)nickel, nickel chloride, and compounds represented by the formulae $(C_6H_5)Ni[OC(C_6H_5)CH=p(C_6H_5)_2][p(C_6H_5)_3]$ and $(C_6H_5)Ni[OC(C_6H_5)C(SO_3Na)=P(C_6H_5)_2][P(C_6H_5)_3]$.

Typical examples of the palladium compound include dichlorobis(benzonitrile)Palladium, carbonyltris(triphenylphosphine)palladium, dichlorobis(triethylphosphine)palladium, bis(isocyanated-t-butyl)palladium, palladium bis-(acetylacetonato), dichloro(tetraphenylcyclobutadiene)palladium, dichloro(1,5-cyclooctadiene)palladium, allyl(cyclopentadienyl)palladium, bis(allyl)palladium, allyl(1,5-cyclooctadiene)palladium tetrafluoroborate, (acetylacetonato)(1,5-cyclooctadiene)palladium tetrafluoroborate and tetrakis(acetonitrile) palladium tetrafluoroborate.

In the polymerization catalyst which is used in the present invention, the transition metal compounds of the component (A) may be used singly or in a combination of two or more thereof.

On the other hand, in the polymerization catalyst, as the component (B), there is used the compound capable of reacting with the above-mentioned transition metal compound or its derivative to form an ionic complex. Examples of this compound (B) include (B-1) an ionic compound capable of reacting with the transition metal compound of the component (A) to form an ionic complex, (B-2) an aluminoxane and (B-3) a Lewis acid.

As the component (B-1), any compound can be used, so long as it can react with the transition metal compound of the component (A) to form an ionic complex, but compounds represented by the following general formulae (VII) and (VIII) can suitably be used:

  (VII)

  (VIII)

(wherein $L^2$ is $M^5$, $R^{10}R^{11}M^6$, $R^{12}{}_3C$ or $R^{13}M^6$). [in the formulae (VII) and (VIII), $L^1$ is a Lewis base, $[Z]^-$ is a non-ligand anion $[Z^1]^-$ or $[Z^2]^-$, and here $[Z^1]^-$ is an anion in which a plurality of groups are bonded to an element, i.e., $[M^4A^1A^2 \ldots A^n]^-$ (wherein $M^4$ is an element in the groups V to XV of the periodic table, preferably an element in the groups XIII to XV. $A^1-A^n$ are each a hydrogen atom, a halogen atom, an alkyl group having 1 to 20 carbon atoms, a dialkylamino group having 2 to 40 carbon atoms, an alkoxy group having 1 to 20 carbon atoms, an aryl group having 6 to 20 carbon atoms, an aryloxy group having 6 to 20 carbon atoms, an alkylaryl group having 7 to 40 carbon atoms, an arylalkyl group having 7 to 40 carbon atoms, a halogen-substituted hydrocarbon group having 1 to 20 carbon atoms, an acyloxy group having 1 to 20 carbon atoms, an organic metalloid group, or a heteroatom-containing hydrocarbon group having 2 to 20 carbon atoms. Two or more of $A^1-A^n$ may form a ring. n is an integer of [(a valence of the central metal $M^4$)+1]), and $[Z^2]^-$ represents a Brønsted acid alone in which a logarithm (pKa) of a reciprocal number of an acid dissociation constant is −10 or less, a conjugate base of a combination of the Brønsted acid and a Lewis acid, or a conjugate base which is usually defined as an ultra-strong acid. The group $[Z^2]^-$ may be coordinated by a Lewis base. Furthermore, $R^9$ represents a hydrogen atom, an alkyl group having 1 to 20 carbon atoms, or an aryl group, an alkylaryl group or an arylalkyl group having 6 to 20 carbon atoms, and $R^{10}$ and $R^{11}$ each represents a cyclopentadienyl group, a substituted cyclopentadienyl group, an indenyl group or a fluorenyl group, and $R^{12}$ represents an alkyl group, an aryl group, an alkylaryl group or an arylalkyl group having 1 to 20 carbon atoms. $R^{13}$ represents a large cyclic ligand such as tetraphenylporphyrin or phthalocyanine. k is an ion valence of $[L^1-R^9]$ or $[L^2]$ and it is an integer of 1 to 3, and p is an integer of 1 or more, and q=(k×p). $M^5$ contains an element in the groups I to III, XI to XIII and XVII of the periodic table, and $M^6$ represents an element in the groups VII to XII].

Here, typical examples of $L^1$ include ammonia, amines such as methylamine, aniline, dimethylamine, diethylamine, N-methylaniline, diphenylamine, N,N-dimethylaniline, trimethylamine, triethylamine, tri-n-butylamine, methyldiphenylamine, pyridine, p-bromo-N,N-dimethylaniline and p-nitro-N,N-dimethylaniline, phosphines such as triethylphosphine, triphenylphosphine and diphenylphosphine, a thioether such as tetrahydrothiophene, an ester such as ethyl benzoate, and nitriles such as acetonitrile and benzonitrile.

Typical examples of $R^9$ include hydrogen, a methyl group, an ethyl group, a benzyl group and a trityl group, and typical examples of $R^{10}$ and $R^{11}$ include a cyclopentadienyl group, a methylcyclopentadienyl group, an ethylcyclopentadienyl group and a pentamethylcyclopentadienyl group. Typical examples of $R^{12}$ include a phenyl group, a p-tolyl group and a p-methoxyphenyl group, and typical examples of $R^{13}$ include a tetraphenylporphine, phthalocyanine, allyl and methallyl. Moreover, typical examples of $M^5$ include Li, Na, K, Ag, Cu, Br, I and $I_3$, and typical examples of $M^6$ include Mn, Fe, Co, Ni and Zn.

Furthermore, in $[Z^1]^-$, i.e., $[M^4A^1A^2 \ldots A^n]^-$, typical examples of $M^4$ include B, Al, Si, P, As and Sb, and B and Al are preferable. Moreover, typical examples of $A^1$, $A^2$–$A^n$ include a dimethylamino group and a diethylamino group as the dialkylamino group; a methoxy group, an ethoxy group, an n-butoxy group and a phenoxy group as the alkoxy group or the aryloxy group; a methyl group, an ethyl group, an n-propyl group, an isopropyl group, an n-butyl group, an isobutyl group, an n-octyl group, an n-eicosyl group, a phenyl group, a p-tolyl, a benzyl group, a 4-t-butylphenyl group and a 3,5-dimethylphenyl group as the hydrocarbon group; fluorine, chlorine, bromine and iodine as the halogen atoms; a p-fluorophenyl group, a 3,5-difluorophenyl group, a pentachlorophenyl group, a 3,4,5-trifluorophenyl group, a pentafluorophenyl group, a 3,5-bis(trifluoromethyl)phenyl group and a bis(trimethylsilyl)methyl group as the heteroatom-containing hydrocarbon group; and a pentamethylantimony group, a trimethylsilyl group, a trimethylgermil group, a diphenylarsine group and a dicyclohexylantimony group as the organic metalloid group.

Furthermore, typical examples of the non-ligand anion, i.e., the Brønsted acid alone in which the pKa is −10 or less, or the conjugate base $[Z^2]^-$ of the combination of the Brønsted acid and the Lewis acid include a trifluoromethanesulfonic acid anion $(CF_3SO_3)^-$, a bis(trifluoromethanesulfonyl)methyl anion, a bis(trifluoromethanesulfonyl)benzyl anion, a bis(trifluoromethanesulfonyl)amide, a perchloric acid anion $(ClO_4)^-$, a trifluoroacetic acid anion $(CF_3CO_2)^-$, a hexafluoroantimony anion $(SbF_6)^-$, a fluorosulfonic acid anion $(FSO_3)^-$, a chlorosulfonic acid anion $(ClSO_3)^-$, a fluorosulfonic acid anion-5-antimony fluoride $(FSO_3\text{-}SbF_5)^-$, a fluorosulfonic acid anion-5-arsenic fluoride $(FSO_3\text{-}AsF_5)^-$ and a trifluoromethanesulfonic acid-5-antimony fluoride $(CF_3SO_3\text{-}SbF_5)^-$.

Typical examples of the ionic compound capable of reacting with the transition metal compound of the above-mentioned component (A) to form an ionic complex, i.e., the (B-1) component compound include triethylammonium tetraphenylborate, tri-n-butylammonium tetraphenylborate, trimethylammonium tetraphenylborate, tetraethylammonium tetraphenylborate, methyl(tri-n-butyl)ammonium tetraphenylborate, benzyl(tri-n-butyl)ammonium tetraphenylborate, dimethyldiphenylammonium tetraphenylborate, triphenyl(methyl)ammonium tetraphenylborate, trimethylanilinium tetraphenylborate, methylpyridinium tetraphenylborate, benzylpyridinium tetraphenylborate, methyl(2-cyanopyridinium) tetraphenylborate, triethylammonium tetrakis(pentafluorophenyl)borate, tri-n-butylammonium tetrakis(pentafluorophenyl)borate, triphenylammonium tetrakis(pentafluorophenyl)borate, tetra-n-butylammonium tetrakis(pentafluorophenyl)borate, tetraethylammonium tetrakis(pentafluorophenyl)borate, benzyl(tri-n-butyl)ammonium tetrakis(pentafluorophenyl)borate, methyldiphenylammonium tetrakis(pentafluorophenyl)borate, triphenyl(methyl)ammonium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridinium tetrakis(pentafluorophenyl)borate, benzylpyridinium tetrakis(pentafluorophenyl)borate, methyl(2-cyanopyridinium) tetrakis(pentafluorophenyl)borate, benzyl(2-cyanopyridinium) tetrakis(pentafluorophenyl)borate, methyl(4-cyanopyridinium) tetrakis(pentafluorophenyl)borate, triphenylphosphonium tetrakis(pentafluorophenyl)borate, dimethylanilinium tetrakis[bis(3,5-ditrifluoromethyl)phenyl]borate, ferrocenium tetraphenylborate, silver tetraphenylborate, trityl tetraphenylborate, tetraphenylporphyrinmanganese tetraphenylborate, ferrocenium tetrakis(pentafluorophenyl)borate, (1,1'-dimethylferrocenium) tetrakis(pentafluorophenyl)borate, decamethylferrocenium tetrakis(pentafluorophenyl)borate, silver tetrakis(pentafluorophenyl)borate, trityl tetrakis(pentafluorophenyl)borate, lithium tetrakis(pentafluorophenyl)borate, sodium tetrakis(pentafluorophenyl)borate, tetraphenylporphyrinmanganese tetrakis(pentafluorophenyl)borate, silver tetrafluoroborate, silver hexafluorophosphate, silver hexafluoroarsenate, silver perchlorinate, silver trifluoroacetate and silver trifluoromethanesulfonate.

The ionic compounds, which are the (B-1) components, capable of reacting with the transition metal compound of the above-mentioned component (A) to form an ionic complex may be used singly or in a combination of two or more thereof.

On the other hand, as the aluminoxane of the (B-2) component, there can be mentioned a chain aluminoxane represented by the general formula (IX)

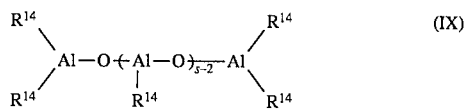

(wherein $R^{14}$s each represents a halogen atom, or an alkyl group, an alkenyl group, an aryl group or an arylalkyl group having 1 to 20 carbon atoms, preferably 1 to 12 carbon atoms, the respective $R^{14}$s may be the same or different, s represents a polymerization degree, and it is an integer of usually 3 to 50, preferably 7 to 40) and a cyclic aluminoxane represented by the general formula (X)

(wherein $R^{14}$s and s are as defined above).

Among the compounds of the general formulae (IX) and (X), the aluminoxanes having a polymerization degree of 7 or more are preferable. In the case that the aluminoxane having a polymerization degree of 7 or more, or a mixture of these aluminoxanes is used, a high activation can be obtained. Furthermore, modified aluminoxanes can also suitably be used which can be obtained by modifying the aluminoxanes represented by the general formulae (IX) and (X) with a compound such as water having an active hydrogen and which are insoluble in usual solvents.

As a preparation method of the above-mentioned aluminoxanes, a method can be mentioned in which an alkylaluminum is brought into contact with a condensation agent such as water, but no particular restriction is put on its means, and the reaction can be carried out in a known manner. For example, there are (1) a method which comprises dissolving an organic aluminum compound in an organic solvent, and then bringing the solution into contact with water, (2) a method which comprises first adding an organic aluminum compound at the time of polymerization, and then adding water, (3) a method which comprises reacting water of crystallization contained in a metallic salt or water adsorbed by an inorganic substance or an organic substance with an organic aluminum compound, and (4) a method which comprises reacting a tetraalkyldialuminoxane with a trialkylaluminum, and further reacting with water. In this connection, the aluminoxane may be that which is insoluble in toluene.

These aluminoxanes may be used singly or in a combination of two or more thereof.

Furthermore, no particular restriction is put on the Lewis acid which is the (B-3) component, and this Lewis acid may be an organic compound or a solid inorganic compound. As the organic compound, boron compounds and aluminum compounds are preferably used, and as the inorganic compound, magnesium compounds and aluminum compounds are preferably used. Examples of the aluminum compounds include bis(2,6-di-t-butyl-4-methylphenoxy)aluminum methyl and (1,1-bi-2-naphthoxy)aluminum methyl, examples of the magnesium compounds include magnesium chloride and diethoxymagnesium, examples of the aluminum compounds include aluminum oxide and aluminum chloride, and examples of the boron compounds include triphenylboron, tris(pentafluorophenyl)boron, tris[3,5-bis-(trifluoromethyl)phenyl]boron, tris[(4-fluoromethyl)phenyl]boron, trimethylboron, triethylboron, tri-n-butylboron, tris-(fluoromethyl)boron, tris(pentafluoroethyl)boron, tris(nonafluorobutyl)boron, tris(2,4,6-trifluorophenyl)boron, tris(3,5-difluoro)boron, tris[3,5-bis(trifluoromethyl)phenyl]boron, bis(pentafluorophenyl)fluoroboron, diphenylfluoroboron, bis(pentafluorophenyl)chloroboron, dimethylfluoroboron, diethylfluoroboron, di-n-butylfluoroboron, pentafluorophenyldifluoroboron, phenyldifluoroboron, pentafluorophenyldichloroboron, methyldifluoroboron, ethyldifluoroboron, n-butyldifluoroboron and boron trifluoride.

These Lewis acids may be used singly or in a combination of two or more thereof.

The use ratio of the catalyst component (A) to the catalyst component (B) in the polymerization catalyst which can be used in the present invention is preferably in the range of 10:1 to 1:100, more preferably 2:1 to 1:10, most preferably 1:1 to 1:5 in terms of a molar ratio in the case that the compound (B-1) is used as the catalyst component (B), and it is preferably in the range of 1:20 to 1:10000, more preferably 1:100 to 1:2000 in terms of a molar ratio in the case that the compound (B-2) is used. Moreover, the ratio is preferably in the range of 10:1 to 1:2000, more preferably 5:1 to 1:1000, most preferably 2:1 to 1:500 in terms of a molar ratio in the case that the compound (B-3) is used.

The polymerization catalyst may contain the abovementioned component (A) and component (B) as the main components, or it may contain the component (A), the component (B) and the organic aluminum compound (C) as the main components.

Here, as the organic aluminum compound which is the component (C), there can be used a compound represented by the general formula (XI)

$$R^{15}_r AlQ_{3-r} \tag{XI}$$

(wherein $R^{15}$ represents an alkyl group having 1 to 10 carbon atoms, Q is a hydrogen atom, an alkoxy group having 1 to 20 carbon atoms, an aryl group having 6 to 20 carbon atoms or a halogen atom, and r is an integer of 1 to 3).

Typical examples of the compound represented by the general formula (XI) include trimethylaluminum, triethylaluminum triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride and ethylaluminum sesquichloride.

These organic aluminum compounds may be used singly or in a combination of two or more thereof.

The use ratio of the catalyst component (A) to the catalyst component (C) is preferably in the range of 1:1 to 1:2000, more preferably 1:5 to 1:1000, most preferably 1:10 to 1:500 in terms of a molar ratio. By the use of the catalyst component (C), a polymerization activity per transition metal can be improved, but if its amount is too large, the organic aluminum compound is wasteful and it remains in large quantities in a polymer unpreferably.

In the present invention, at least one of the catalyst components can be supported on a suitable carrier and then used. No particular restriction is put on the kind of carrier, and inorganic oxide carriers, other inorganic carriers and organic carriers all can be used, but the inorganic oxide carriers and the other inorganic carriers are particularly preferable.

Typical examples of the inorganic oxide carriers include $SiO_2$, $Al_2O_3$, MgO, $ZrO_2$, $TiO_2$, $Fe_2O_3$, $B_2O_3$, CaO, ZnO, BaO, $ThO_2$ and mixtures thereof, for example, silica-alumina, zeolite, ferrite, sepiolite and glass fiber. Above all, $SiO_2$ and $Al_2O_3$ are particularly preferable. In this connection, the above-mentioned inorganic oxide carrier may contain a small amount of a carbonate, a nitrate, a sulfate or the like.

On the other hand, examples of the carriers other than mentioned above include magnesium compounds and their complex salts represented by the general formula $MgR^{16}_x X^3_y$ which are typified by magnesium compounds such as $MgCl_2$ and $Mg(OC_2H_5)_2$. Here, $R^{16}$ represents an alkyl group having 1 to 20 carbon atoms, an alkoxy group having 1 to 20 carbon atoms or an aryl group having 6 to 20 carbon atoms, $X^3$ is a halogen atom or an alkyl group having 1 to 20 carbon atoms, x is from 0 to 2, y is from 0 to 2, and x+y=2. The respective $R^{16}$s and $X^3$s may be the same or different.

Furthermore, examples of the organic carriers include polymers such as polystyrene, substituted polystyrenes, styrene-divinylbenzene copolymer, polyethylene, polypropylene and polyarylate, starch and carbon.

As the carriers which can be used in the present invention, preferable are $MgCl_2$, $MgCl(OC_2H_5)$, $Mg(OC_2H_5)_2$, $SiO_2$, $Al_2O_3$ and the like. The state of the carrier depends upon its kind and a manufacturing process, but its average particle diameter is usually in the range of 1 to 300 μm, preferably 10 to 200 μm, more preferably 20 to 100 μm.

If the particle diameter is small, the fine power of the polymer increases, and if the particle diameter is large, the coarse particles of the polymer increase, which causes the deterioration of a bulk density and the clogging of a hopper.

Moreover, the specific surface area of the carrier is usually in the range of 1 to 1000 m²/g, preferably 50 to 500 m²/g, and its pore volume is usually in the range of 0.1 to 5 cm³/g, preferably 0.3 to 3 cm³/g.

If either of the specific surface area and the pore volume deviates from the above-mentioned range, a catalyst activity deteriorates sometimes. In this connection, the specific surface area and the pore volume can be calculated from the volume of an adsorbed nitrogen gas in accordance with a BET method [refer to Journal of the American Chemical Society, Vol. 60, p. 309 (1983)].

Furthermore, it is desirable that the above-mentioned carrier, when used, is calcined usually at 150 to 1000° C., preferably 200° to 800° C.

In the case that at least one of the catalyst components is supported on the above-mentioned carrier, it is desirable that at least one of the catalyst component (A) and the catalyst component (B), preferably both of the catalyst component (A) and the catalyst component (B) are supported.

No particular restriction is put on a method for supporting at least one of the component (A) and the component (B), but there can be employed, for example, (1) a method of mixing at least one of the component (A) and the component (B) with the carrier, (2) a method of mixing, in an inert solvent, at least one of the component (A) and the component (B) with the carrier, after the carrier has been treated with an organic aluminum compound or a halogen-containing silicon compound, (3) a method of reacting the carrier, the component (A) and/or the component (B) with the organic aluminum compound or the halogen-containing silicon compound, (4) a method of mixing the component (B) or the component (A) with the carrier, after the component (A) or the component (B) has been supported on the carrier, (5) a method of mixing the carrier with a catalytic reaction product of the component (A) and the component (B), and (6) a method in which the carrier is allowed to coexist in the catalytic reaction of the component (A) with the component (B).

Incidentally, in the reactions of the abovementioned methods (4), (5) and (6), the organic aluminum compound of the component (C) can be added.

The thus obtained catalyst may be taken out as a solid by once distilling off the solvent and then used for the polymerization, or may be used for the polymerization as it is.

Moreover, in the present invention, the catalyst can be formed by carrying out the operation of supporting at least one of the component (A) and the component (B) on the carrier in a polymerization system. For example, a process can be employed which comprises adding at lease one of the component (A) and the component (B), the carrier and, if necessary, the organic aluminum compound of the abovementioned component (C), further adding a material monomer under atmospheric pressure to 20 kg/cm$^2$, and then doing prepolymerization at $-20°$ to $200°$ C. for a period of 1 minute to 2 hours to produce catalyst particles.

In the present invention, the use ratio of the abovementioned compound (B-1) to the carrier is preferably in the range of 1:5 to 1:10000, more preferably 1:10 to 1:500, and the use ratio of the compound (B-2) to the carrier is preferably in the range of 1:0.5 to 1:1000, more preferably 1:1 to 1:50 in terms of a weight ratio. Furthermore, it is desirable that the use ratio of the compound (B-3) to the carrier is preferably in the range of 1:5 to 1:10000, more preferably 1:10 to 1:500 in terms of a weight ratio. In addition, it is desirable that the use ratio of the component (A) to the carrier is preferably in the range of 1:5 to 1:10000, more preferably 1:10 to 1:500 in terms of a weight ratio.

If the use ratio of the component (B) [the component (B-1), the component (B-2) or the component (B-3)] to the carrier, or the use ratio of the component (A) to the carrier deviates from the above-mentioned range, the activity deteriorates sometimes. The average particle diameter of the thus prepared catalyst for the polymerization is usually in the range of 2 to 200 μm, preferably 10 to 150 μm, particularly preferably 20 to 100 μm, and the specific surface area of the catalyst is usually in the range of 20 to 1000 m$^2$/g, preferably 50 to 500 m$^2$/g. If the average particle diameter is less than 2 μm, the amount of the fine powder in the polymer increases sometimes, and if it is more than 200 μm, the coarse particles in the polymer increase sometimes. If the specific surface area is less than 20 m$^2$/g, the activity deteriorates sometimes, and if it is in excess of 1000 m$^2$/g, the bulk density of the polymer deteriorates sometimes. Furthermore, in the catalyst, the amount of the transition metal in 100 g of the carrier is usually in the range of 0.05 to 10 g, particularly preferably 0.1 to 2 g. If the amount of the transition metal is outside the above-mentioned range, the activity deteriorates sometimes.

By supporting the component on the carrier, there can be obtained the polymer having a high bulk density and an excellent particle diameter distribution which are industrially advantageous.

In this connection, when the olefin graft copolymer (II) is prepared, it is desirable that such a polymerization catalyst as not to form any double bond at a terminal is selected as the polymerization catalyst from the above-mentioned polymerization catalysts and then used.

The olefin copolymer (I) of the present invention, even if it is a precursor of the olefin graft copolymer (II), can be obtained by the reaction step [1], i.e., the step in which the above-mentioned olefin is polymerized with the diolefin in the presence of the above-mentioned polymerization catalyst. In this case, the polymerization catalyst is suitably selected from the above-mentioned polymerization catalysts and then used so as to obtain the olefin copolymer (I) in which a relation between the content of a unit derived from the diolefin and the total content of unsaturated groups is specified. In this reaction step [1], by the use of the diolefin, the introduction of a carbon-carbon unsaturated group and a crosslinking reaction are carried out, and a reaction of producing an unsaturated group such as a terminal vinyl group derived from an olefin active terminal is advanced.

With regard to the feed ratio of the olefin to the diolefin, both the components are used so that a diolefin/-olefin molar ratio may be usually within the range of $1/10^6$ to $10^2/1$, preferably $1/10^4$ to $10/1$. Furthermore, one or more kinds of olefins can be used, and its composition can be optionally set in consideration of the amount of an unsaturated group such as the required terminal vinyl group and a composition ratio of the copolymer, but by increasing the feed ratio of ethylene, the amount of the terminal vinyl group can be increased. In addition, by the use of titanium, vanadium or a chromium compound as the catalyst, the amount of the terminal vinyl group can be increased.

The ratio of the monomer component to the catalyst component in the reaction step [1] is selected so that a monomer component/catalyst component (A) molar ratio may be in the range of $10^7/1$ to $10/1$, preferably $10^5/1$ to $10^2/1$. Moreover, a polymerization pressure is usually selected in the range of from atmospheric pressure to 30 kg/cm$^2$.G, and a polymerization temperature is preferably on a higher side in the range in which the catalyst activity is not impaired, and it is usually selected in the range of $-100°$ to $300°$ C., preferably $-50°$ to $200°$ C., more preferably $10°$ to $180°$ C.

The thus obtained olefin copolymer (I) of the present invention is a long-chain branched copolymer comprising a unit derived from the olefin and a unit derived from the diolefin, and its weight-average molecular weight is required to be in the range of 200 to 800,000, preferably 500 to 700,000, more preferably 1,000 to 700,000. Incidentally, even if the weight-average molecular weight of the olefin copolymer (I) of the present invention is in the relatively low range of 200 to 100,000, a graft copolymer having a sufficiently high molecular weight can be obtained by the graft polymerization of the olefin. This weight-average molecular weight is a molecular weight in terms of polyethylene measured by gel permeation chromatography (GPC).

It is necessary that the content of the unit derived from the diolefin in the copolymer (I) should be in the range of 0.002 to 30 mol%, preferably 0.004 to 25 mol%, more preferably 0.008 to 15 mol%. If this content is less than 0.002 mol%, the crosslinking reaction and the amount of a pendant unsaturated residue are insufficient, so that a graft efficiency in the undermentioned reaction step [2] is low. Moreover, if the content is more than 30 mol%, the crosslinking reaction excessively occurs, so that the tendency of nonfusion is observed.

In the olefin copolymer (I), a relation between the content of the unit derived from the diolefin (DOU mol%) and the total content of the unsaturated group (TUS mol%) observed in a molecular chain is required to meet the formula $$0.001 \leq TUS/DOU \leq 200$$

preferably $$0.005 \leq TUS/DOU \leq 150$$

more preferably $$0.01 \leq TUS/DOU \leq 100.$$

If the TUS/DOU is less than 0.001, the amount of the unsaturated residue which is a substantial reaction point in the next graft reaction is small, and the unsaturated residue derived from the introduced diolefin probably disappears by the crosslinking. Therefore, even if the next graft reaction is carried out, the sufficient activation energy of melt fluidization is not exerted, so that molding/working properties which are intended by the present invention cannot be obtained. If the TUS/DOU is more than 200, the production ratio of the long-chain branched copolymer is high, so that a substantial reaction point concentration in the undermentioned reaction step [2] is low, with the result that a conversion of the olefin copolymer (I) deteriorates.

Incidentally, the content of the unit derived from the diolefin (DOU mol%) and the total content of the unsaturated group (TUS mol%) observed in a molecular chain can be calculated as follows. In the first place, with regard to the DOU, the calculation of its content is possible from analysis by NMR. On the other hand, with regard to the TUS, when the unsaturated group derived from the diolefin is a vinyl group, this vinyl group can substantially scarcely be distinguished from a vinyl group derived from an α-olefin produced at the terminal of the molecular chain, and so the TUS is observed as the sum of both the vinyl groups for the time being. On the other hand, if the unsaturated group is not the vinyl group, the TUS corresponds to the sum of the content of the unsaturated residue derived from the diolefin and the content of the vinyl group derived from the α-olefin at the terminal of the molecular chain.

Here, the vinyl type unsaturated group at the terminal of the molecule observed in the olefin copolymer of the present invention, or the unsaturated groups corresponding to the sum of this vinyl group and the vinyl group derived from the diolefin can easily be identified and determined by the measuring the infrared absorption spectra of press sheets formed at a temperature of 190° C.

| Kind of terminal unsaturated group | Position of absorption (cm$^{-1}$) |
|---|---|
| Vinylene group | 963 |
| Vinylidene group | 888 |
| Vinyl group | 907 |

In the case of the olefin copolymer in which ethylene is particularly a main monomer, the production ratio of the terminal vinyl group is usually 30 mol% or more, preferably 40 mol% or more, more preferably 50 mol% or more based on the sum of the above-mentioned unsaturated groups. In this connection, the amount of the terminal vinyl group can be calculated in accordance with the formula $$n = 0.114 A_{907}/[d \cdot t]$$

[wherein n is the number of the terminal vinyl groups per 100 carbon atoms, $A_{907}$ is an absorbance at 907 cm$^{-1}$, d is a resin density (g/cm$^3$), and t is the thickness of a film (mm)].

Furthermore, when the unsaturated group derived from the diolefin is different from the vinyl group, the number of the unsaturated groups can easily be calculated by replacing 0.114 which is a conversion factor of the above-mentioned formula with a conversion factor at a peak at which the unsaturated group is observed.

Additionally, in the olefin copolymer (I), usually, its melt flow rate (MFR) measured at a temperature of 190° C. under a load of 2.16 kg is in the range of 0.001 to 2000 g/10 minutes, or its reduced viscosity measured under conditions of a temperature of 135° C. and a concentration of 0.2 g/dl in decalin is in the range of 0.05 to 20 dl/g.

The olefin graft copolymer (II) of the present invention can be obtained by the reaction step [2], i.e., a step in which the olefin copolymer (I) obtained in the above-mentioned reaction step [1] is graft-polymerized with at least one of the above-mentioned olefins in the presence of the above-mentioned polymerization catalyst. In the case that the reaction steps [1] and [2] are continuously carried out without separating the olefin copolymer (I), the polymerization catalyst does not have to be newly added.

In the olefin graft copolymer (II), it is desirable that the content of the olefin copolymer (I) segment is in the range of 0.05 to 99% by weight, preferably 1 to 98% by weight, more preferably 2 to 95% by weight. If this content is more than 99% by weight, graft moieties decreases, so that the desired working properties cannot be obtained, and if it is less than 0.05% by weight, the desired working properties cannot be obtained.

Moreover, in the olefin graft copolymer (II), usually, its melt flow rate (MFR) measured at a temperature of 190° C. under a load of 2.16 kg is in the range of 0.001 to 2000 g/10 minutes, or its reduced viscosity measured under conditions of a temperature of 135° C. and a concentration of 0.2 g/dl in decalin is in the range of 0.05 to 20 dl/g. In addition, its weight-average molecular weight/number-average molecular weight (Mw/Mn) is usually in the range of 2 to 40. That is to say, the olefin graft copolymer (II) can be considered to be a copolymer uniformly holding a composition distribution and having a controlled molecular weight distribution.

Furthermore, as a result of $^{13}$C-NMR structure analysis, a copolymer chain produced in the reaction step [2] has a high randomness. With regard to a relation between a melting point and a comonomer content, a drop ratio of the melting point is high at a low comonomer content, in contrast to a conventional olefin copolymer.

In the present invention, a hydrogenation treatment can be carried out in order to better the thermal stability of the olefin copolymer (I) and the olefin graft copolymer In this hydrogenation step, the olefin copolymer (I) obtained in the reaction step [1] and the olefin graft copolymer (II) obtained in the reaction step [2] are subjected to a hydrogenation reaction in the presence of a hydrogenation catalyst, for example, a catalyst containing, as main components, (A') a transition metal compound and (B') a compound capable of reacting with this transition metal compound or its derivative to form an ionic complex, thereby preparing an olefin copolymer (III) and an olefin graft copolymer (IV) which do not substantially have the remaining unsaturated groups as targets.

As the above-mentioned catalyst components (A') and (B'), there can be used the same as the previously described catalyst components (A) and (B) in the above-mentioned reaction steps [1] and [2]. As the catalyst in this hydrogenation step, an organic aluminum compound can be used as a component (C') together with the components (A') and (B') in a certain case. As the organic aluminum compound of this component (C'), the same as the previously described compound (C) in the reaction steps [1] and [2] can be used.

The components (A'), (B') and (C') in the hydrogenation step may be the same as or different from the components (A), (B) and (C) in the reaction steps [1] and [2]. In the case that the reaction step [1] or [2] and the hydrogenation step are continuously carried out, the fresh catalyst component is not particularly required in the hydrogenation step.

Furthermore, the use ratio of the catalyst components (A'), (B') and (C') is the same as the previously described use ratio of the catalyst components (A), (B) and (C) in the reaction steps [1] and [2]. Besides, in this hydrogenation step, at least one of the catalyst components can be supported on a suitable carrier and then used, as in the case of the reaction steps [1] and [2].

No particular restriction is put on the hydrogenation catalyst which can be used in the process of the present invention, and there can be employed the catalysts previously mentioned in detail and catalysts which can usually be used at the time of the hydrogenation of the olefin compound. For example, the following catalysts can be mentioned.

Examples of heterogeneous catalysts include nickel, palladium and platinum as well as solid catalysts obtained by supporting these metals on carriers such as carbon, silica, diatomaceous earth, alumina and titanium oxide, for example, nickel-silica, nickel-diatomaceous earth, palladium-carbon, palladium-silica, palladium-diatomaceous earth and palladium-alumina. Examples of the nickel catalyst include Raney nickel catalysts, and examples of the platinum catalyst include a platinum oxide catalyst and platinum black. Examples of homogeneous catalysts include catalysts containing metals in the groups VIII to X of the periodic table as basic components, for example, catalysts comprising Ni and Co compounds and organic metallic compounds of metals selected from the groups I, II and III of the periodic table such as cobalt naphthenate-triethylaluminum, cobalt octenoate-n-butyllithium, nickel acetylacetonatotriethylaluminum, and Rh compounds.

In addition, Ziegler hydrogenation catalysts disclosed by M. S. Saloan et al. [J. Am. Chem. Soc., 85, p. 4014 (1983)] can also effectively used. Examples of these catalysts include the following.

$Ti(O-iC_3H_7)_4-(iC_4H_9)_3Al$, $Ti(O-iC_3H_7)_4-(C_2H_5)_3Al$, $(C_2H_5)_2TiCl_2-(C_2H_5)_3Al$, $Cr(acac)_3-(C_2H_5)_3Al$ (wherein acac represents acetylacetonato), $Na(acac)_3-(iC_4H_9)_3Al$, $Mn(acac)_3-(C_2H_5)_3Al$, $Fe(acac)_3-(C_2H_5)_3Al$, $Ca(acac)_3-(C_2H_5)_3Al$, and $(C_7H_5COO)_3Co-(C_2H_5)_3Al$.

The amount of the catalyst to be used in the hydrogenation step is suitably selected so that a molar ratio of the remaining unsaturated groups to the hydrogenation catalyst components in the copolymers (I) and (II) may be in the range of $10^7:1$ to $10:1$, preferably $10^6:1$ to $10^2:1$.

Furthermore, the charge pressure of hydrogen is suitably in the range of from atmospheric pressure to 50 kg/cm²G. Besides, a reaction temperature is preferably on a higher side in the range in which the olefin copolymer (I) and the olefin graft copolymer (II) do not decompose, and it is usually selected in the range of −100° to 300° C., preferably −50° to 200° C., more preferably 10° to 180° C.

With regard to the olefin copolymer (III) and the olefin graft copolymer (IV) obtained by this hydrogenation step, usually, its melt flow rate (MFR) measured at a temperature of 190° C. under a load of 2.16 kg is in the range of 0.001 to 2,000 g/10 minutes, or its reduced viscosity measured under conditions of a temperature of 135° C. and a concentration of 0.2 g/dl in decalin is in the range of 0.05 to 20 dl/g. Moreover, it is necessary that the olefin copolymer (III) and the olefin graft copolymer (IV) should not substantially contain the remaining unsaturated groups derived from the diolefin as well as unsaturated groups such as terminal vinyl groups and terminal vinylidene groups produced at polymerization-active terminals.

Next, with regard to the thermal stability of the melt viscosity of these hydrogenated copolymers, in the measurement of the melt viscosities of the copolymers (III) and (IV) at a constant shear rate, a time when a load has been applied and the melt viscosity of each sample has been stabilized is regarded as a measurement start, and in the case that a melt viscosity at this time is represented by $\eta^*_i$ and a melt viscosity 80 minutes after the start of the measurement is represented by $\eta^*$, a value of B in the formula $$(\eta^* - \eta^*_i)/\eta^*_i \times 100 = B$$

is desirably in the range of −10 to 10, preferably −5 to 5, more preferably −3 to 3 (incidentally, the detailed measurement procedure of the melt viscosity will be described hereinafter).

These hydrogenated olefin copolymer (III) and olefin graft copolymer (IV) are excellent in heat stability, can inhibit the generation of a gel in blow forming or film formation, and is suitable for high-temperature molding.

In the present invention, as the preferable olefin graft copolymer (II) and the hydrogenated olefin graft copolymer (IV), there can be mentioned ethylenic graft copolymers containing 85 to 99.99 mol% of a unit derived from ethylene and having a density in the range of 0.86 to 0.97 g/cm³ and a crystallization enthalpy of 10 J/g or more. The density can be controlled in the above-mentioned range, i.e., a wide range of from an ultra-low-density polyethylene to a high-density polyethylene by changing the content of a unit derived from an α-olefin such as 1-butene or 1-octene as well as the density and content of the olefin copolymer (I).

The crystallization enthalpy lowers owing to the increase in the α-olefin unit content, and can be controlled by presence/absence of the crystallinity of the olefin copolymer (I), the degree of the crystallinity and the content of the olefin copolymer (I). Furthermore, with regard to the measurement of this crystallization enthalpy, an exothermic peak of the crystallization, which can be seen when a sheet pressed at 190° C. is molten at 150° C. for 5 minutes and then cooled to −50° C. at a rate of 10° C./min, is measured by a differential scanning calorimeter, and from the area of the crystallization peak, a value which is the crystallization enthalpy is calculated.

Furthermore, in the preferable ethylenic graft copolymer in which the content of the unit derived from ethylene is in the range of 85 to 99.99 mol%, an activation energy (Ea) of melt fluidization is present in the range of 6 to 20 kcal/mol, and a 5% weight decrease temperature in air which can be obtained by thermogravimetric analysis is 300° C. or more, preferably 305° C. or more, more preferably 310° C. or more. With regard to the activation energy (Ea) of the melt fluidization, a high pressure process low-density polyethylene has a larger Ea and is more excellent in working properties such as blow molding, as compared with a straight-chain polyethylene prepared by the use of a Ziegler catalyst. Therefore, by optionally controlling the Ea, the working properties of from injection molding to the blow molding and the film formation can be imparted, and therefore the Ea is an extremely important index.

Incidentally, the activation energy (Ea) can be calculated as follows. That is to say, the frequency dependence ($10^{-2}$ to $10^2$ rad/sec) of dynamic viscoelasticity at each of measurement temperatures of 150° C., 170° C., 190° C., 210° C. and 230° C. is measured, and the activation energy (Ea) is then calculated from shift factors of G', G" at the respective temperatures and a reciprocal of an absolute temperature in accordance with the Arrhenius' equation on the basis of a standard temperature of 170° C. by the use of a temperature-time conversion rule.

Furthermore, with regard to the thermal stability, the polymer having a carbon-carbon unsaturated group is usually low in thermal stability, and is poor in molding/working properties and weathering resistance. Therefore, an intricate treatment using additives is necessary, but in the olefin graft copolymers (II) and (IV) of the present invention, their 5% weight decrease temperatures are 300° C. or more, preferably 305° C. or more, more preferably 310° C. or more, and hence the above-mentioned problem can be solved. The 5% weight decrease temperature means a temperature at the time of 5% weight decrease in the case that heating is carried out at a rate of 10° C./min at an air flow rate of 300 ml/min. This improvement of the thermal stability can be given by the decrease in the unsaturated groups in the copolymer (II) by the graft polymerization and the copolymer (IV) by the hydrogenation treatment.

Next, as the preferable olefin copolymer (I), olefin graft copolymer (II), hydrogenated olefin copolymer (III) and hydrogenated olefin graft copolymer (IV), there can be mentioned propylene copolymers in which the content of a unit derived from propylene is in the range of 85 to 99.99 mol%, the crystallization enthalpy is 10 J/g or more and the activation energy (Ea) of the melt fluidization is in the range of 12 to 27 kcal/mol. In the case of the olefin graft copolymer (II), the reaction steps [1] and [2] may continuously or simultaneously be carried out, and at least one of the olefins may be grafted on the olefin copolymer (I) obtained in the step [1] in the presence of the polymerization catalyst.

In the above-mentioned propylene copolymers, the activation energy (Ea) of the melt fluidization is sufficiently improved and the working properties are more excellent as compared with a propylene homopolymer having a substantially equal weight-average molecular weight. More suitable are the propylene copolymers in which the Ea is in the range of 12 to 27 kcal/mol, preferably 15 to 25 kcal/mol.

The characteristics of the olefin graft copolymers (II) and (IV) of the present invention depend upon the kind of olefin which is used in the reaction step [1] and the kind of olefin which is used in the reaction step [2]. For example, a polymer obtained by using ethylene or ethylene and an α-olefin as the olefin in the reaction step [1] and using ethylene as the α-olefin in the reaction step [2] is an HDPE having the improved molding/working properties. Moreover, a polymer obtained by using ethylene or ethylene and an α-olefin in the reaction step [1] and using ethylene and an α-olefin in the reaction step [2] is a novel high-performance LDPE, VLDPE (an ultra-low-density polyethylene) or L-LDPE in which the molding/working properties are controlled and to which a good transparency and heat-sealing properties are imparted.

Furthermore, a polymer obtained by using ethylene or ethylene and an α-olefin in the reaction step [1] and introducing an isotactic polypropylene segment, a branched α-olefin (e.g., 4-methylpentene-1 or the like) polymer segment, or an isotactic, sydiotactic or atactic polystyrene segment in the reaction step [2] is a novel thermoplastic elastomer, which is useful for modification, for example, toughening or softening of the above-mentioned polymer produced in the reaction step [2].

In addition, in the case that propylene or propylene and an α-olefin are used in the reaction step [1] and propylene is used in the reaction step [2], a branched propylene copolymer having the improved molding/working properties can be obtained, and by changing polymerization conditions and the amount of the diolefin to be used, the copolymer in which crystallinity and the Ea are controlled can be prepared.

The olefin copolymer (I), the olefin graft copolymer (II), the hydrogenated olefin copolymer (III) and the hydrogenated olefin graft copolymer (IV) of the present invention can each be mixed with another thermoplastic resin and then used. Examples of the other thermoplastic resin include polyolefin resins, polystyrene resins, condensation series high-molecular weight polymers and addition polymerization series high-molecular weight polymers. Typical examples of the polyolefin resins include high-density polyethylenes, low-density polyethylenes, poly-3-methylbutene-1, poly-4-methylpentene-1, straight-chain low-density polyethylenes obtained by the use of 1-butene, 1-hexene, 1-octene, 4-methylpentene-1 and 3-methylbutene-1 as comonomer components, ethylene-vinyl acetate copolymers, saponified ethylene-vinyl acetate copolymers, ethylene-acrylic acid copolymers, ethylene-acrylic acid ester copolymers, ethylenic ionomers and polypropylene. Typical examples of the polystyrene resins include general-purpose polystyrenes, isotactic polystyrenes and (rubber modified) high-impact polystyrenes. Typical examples of the condensation series high-molecular weight polymers include polyacetal resins, polycarbonate resins, polyamide resins such as 6-nylon and 6,6-nylon, polyester resins such as polyethylene terephthalates and polybutylene terephthalates, polyphenylene oxide resins, polyimide resins, polysulfone resins, polyethersulfone resins and polyphenylene sulfide resins. Examples of the addition polymerization series high-molecular weight polymers include polymers obtained from polar vinyl monomers and polymers obtained from diene monomers, typically, polymethyl methacrylate, polyacrylonitrile, acrylonitrile-butadiene copolymer, acrylonitrile-butadiene-styrene copolymer, diene polymers in which a diene chain is hydrogenated, and thermoplastic elastomers. Among these thermoplastic resins, the polyolefin resins are suitable.

Next, the present invention will be described in more detail with respect to examples.

EXAMPLE 1

(1) Preparation of methylaluminoxane

In a 500-ml glass container which had been purged with argon were placed 200 ml of toluene, 17.7 g (71 mmols) of copper sulfate pentahydrate ($CuSO_4 \cdot 5H_2O$) and 24 ml (250 mmols) of trimethylaluminum, and the mixture was then reacted at 40° C. for 8 hours. Afterward, from a solution obtained by removing solid components, toluene was further distilled off under reduced pressure to obtain 6.7 g of a catalystic product (methylaluminoxane). According to measurement by a cryoscopic method, the molecular weight of the product was 610. Furthermore, a high magnetic field component by $^1$H-NMR measurement, i.e., a methyl proton signal based on a (Al—$CH_3$) bond was observed in the range of 1.0 to −0.5 ppm under a tetramethylsilane standard according to the observation of its proton nuclear magnetic resonance spectrum at room temperature in a toluene solution. The proton signal (0 ppm) of tetramethylsilane was present in an observation range based on the methyl proton having the Al—CH$_3$ bond. Therefore, this methyl proton signal based on the Al—CH$_3$ bond was measured on the basis of the methyl proton signal 2.35 ppm of toluene under the tetramethylsilane standard, and the high magnetic field components (i.e., −0.1 to −0.5 ppm) were separated from other magnetic field components (i.e., 1.0 to −0.1 ppm). At this time, the content of the high magnetic field components were 43% of the total.

(2) Preparation of copolymers
(i) Preparation of a copolymer (I)

In a 500-ml pressure glass container were placed 100 ml of toluene, 30 mmols of divinylbenzene (the content of m-isomer and p-isomer=55 wt %), 1 mmol of triisobutylaluminum and 2 mmols of methylaluminoxane prepared in the above-mentioned (1) in a nitrogen atmosphere, and the solution was then heated up to 80° C. An ethylene pressure of 0.6 kg/cm$^2$G was applied thereto to saturate the solution with ethylene. Moreover, 10 micromols of dicyclopentadienylzirconium dichloride was added thereto to start copolymerization. While the ethylene pressure was maintained at 0.6 kg/cm$^2$G, reaction was carried out for 150 minutes. At the end of the reaction, the polymer was uniformly dissolved, and it was then precipitated again in a large amount of methanol and collected by filtration. Afterward, vacuum drying was carried out at 40° C. for 20 hours to obtain 2.3 g of a white polymer.

A weight-average molecular weight (Mw) and a molecular weight distribution (Mw/Mn) of this copolymer were measured under the following conditions, and as a result, Mw=5,670 and Mw/Mn=6.6.

Device: Waters ALC/GPC 150C

Column: Toso Co., Ltd., TSK HM+GMH6×2

Solvent: 1,2,4-trichlorobenzene

Temperature: 135° C.

Flow rate: 1 ml/min (in terms of polyethylene)

Furthermore, in the infrared absorption spectrum (IR) of this copolymer, the absorption of a vinyl group was observed at about 1,630 cm$^{-1}$ and about 907 cm$^{-1}$, and the absorption of a divinylbenzene residue was present at about 1,602 cm$^{-1}$.

The content of the divinylbenzene unit measured by $^1$H-NMR was 0.62 mol%, and the amount of the vinyl group observed at IR 907 cm$^{-1}$ was 0.44 mol%. Therefore, a total unsaturated group content/divinylbenzene unit content (molar ratio) was 0.71.

(ii) Preparation of a copolymer (II)

0.55 g of the copolymer (I) obtained in the above-mentioned (i) was dissolved in 80 ml of toluene, and nitrogen bubbling was then carried out for 30 minutes. Next, 0.5 mmol of triisobutylaluminum and 1 mmol of methylaluminoxane prepared in the above-mentioned (1) were added to the solution, and it was then heated up to 80° C. An ethylene pressure of 3 kg/cm$^2$G was applied thereto, and the solution was then saturated with ethylene. Moreover, 2 micromols of dicyclopentadienylzirconium dichloride were added thereto to start copolymerization, and while the ethylene pressure was maintained at 3 kg/cm$^2$G, reaction was carried out for 170 minutes.

After the completion of the reaction, the solution was poured into methanol, followed by filtration, to collect a graft copolymer (II). Next, vacuum drying was carried out at 80° C. for 4 hours to obtain 15.6 g of a white polymer. The weight ratio of the yield of the copolymer (I) to that of the graft copolymer (II) was 1:28.4. The weight-average molecular weight (Mw) and the molecular weight distribution (Mw/Mn) of this copolymer (II) were 93000 and 9.1, respectively, and its distribution was in the form of a single peak. Moreover, the reduced viscosity of the copolymer measured under conditions of a temperature of 135° C. and a concentration of 0.2 g/dl in decalin was 2.19 dl/g.

(3) Evaluation of the graft copolymer (II)
(i) Crystallization enthalpy (ΔH) and melting point (Tm)

As a device, a differential scanning calorimeter DSC7 made by Perkin Elmer Co., Ltd. was used, and measurement was made in the following manner. That is to say, there were measured an exothermic peak of the crystallization seen when a sheet pressed at 190° C. was molten at 150° C. for 5 minutes and then cooled to −50° C. at a rate of 10° C./min, and an endothermic peak of melting seen at the time of a temperature rise of 10° C./min. The melting point (Tm) was 132.7° C., and the crystallization enthalpy (ΔH) was 186 J/g.

(ii) Density

The density of a pressed film was measured with a density gradient tube, and as a result, it was 0.967 g/cm$^3$.

(iii) Activation energy (Ea) of the melt fluidization

As a device, RMS E-605 made by Rheometrics Co., Ltd. was used, and measurement was made in the following manner. That is to say, the frequency dependence (10$^{-2}$ to 10$^2$ rad/sec) of dynamic viscoelasticity at each of measurement temperatures of 150° C., 170° C., 190° C., 210° C. and 230° C. was measured, and the activation energy (Ea) was then calculated from shift factors of G', G" at the respective temperatures and a reciprocal of an absolute temperature in accordance with the Arrhenius' equation on the basis of a standard temperature of 170° C. by the use of a temperature-time conversion rule.

As a result, Ea was 8.9 kcal/mol.

(iv) Thermal stability

As a device, a thermogravimetric analyzer SSC 5000 made by Seiko Electronics Co., Ltd. was used, and a weight decrease in the case that temperature was raised at a rate of 10° C./min at an air flow rate of 300 ml/min was measured to determine a temperature at the time of the 5% weight decrease. As a result, the thermal stability was 337° C.

EXAMPLE 2

(1) Preparation of a copolymer
(i) Preparation of a copolymer (I)

The same procedure as in Example 1-(2)-(i) was carried out except that in Example 1-(2)-(i), divinylbenzene was replaced with 10 mmols of 1,5-hexadiene and 0.5 mmol of triisobutylaluminum, 2 micromols of dicyclopentadienylzirconium dichloride and an ethylene pressure of 0.4 kg/cm$^2$G were employed, to prepare a copolymer (I). As a result, 1.7 g of the copolymer (I) was obtained.

In this copolymer (I), Mw was 5630 and Mw/Mn was 6.3, and the content of a 1,5-hexadiene unit was 1.4 mol%. In addition, the content of a vinyl group corresponding to an unsaturated group in a molecular chain was calculated from an absorbance at 907 cm$^{-1}$ which appeared on an infrared absorption spectrum, and as a result, it was 0.08 mol%. Therefore, a total unsaturated group content/1,5-hexadiene unit content molar ratio was 0.057.

(ii) Preparation of a graft copolymer (II)

The same procedure as in Example 1-(2)-(ii) was carried out except that in Example 1-(2)-(ii), 1 g of the copolymer (I) prepared in the above-mentioned (i) was used as the copolymer, to prepare a graft copolymer (II), whereby 12.4 g of the white polymer was obtained.

The weight ratio of the copolymer (I) to the graft copolymer (II) was 1:11.4. Furthermore, the weight-average molecular weight (Mw) of the graft copolymer (II) was 58,600, and a molecular weight distribution (Mw/Mn) was 15.0, and the distribution of the molecular weight was in the form of a single peak.

(2) Evaluation of the graft copolymer (II)

The same procedure as in Example 1-(3) was carried out. The results are shown in Table 1.

EXAMPLE 3

(1) Preparation of a copolymer (I)

In a 10-liter stainless steel pressure autoclave were placed 40 ml of toluene, 2 mmols of divinylbenzene, 0.5 mmol of triisobutylaluminum, 5 mmols of methylaluminoxane prepared in Example 1-(1) and 0.03 mmol of pentamethylcyclopentadienyltitanium trimethoxide [Cp*Ti(OMe)$_3$], and the mixture was then heated up to 80° C. Next, ethylene was added to the solution under a constant pressure of 4 kg/cm$^2$G to carry out copolymerization for 60 minutes, whereby 15.6 g of the copolymer (I) was obtained.

The weight-average molecular weight (Mw) and the molecular weight distribution (Mw/Mn) of this copolymer (I) were 14,500 and 23.0, respectively. Furthermore, the content of a divinylbenzene unit was 0.11 mol%, and the content of a terminal vinyl group at 907 cm$^{-1}$ which appeared on an infrared absorption spectrum was 0.11 mol%. In addition, the absorption of a terminal α-olefin was observed at 1,646 cm$^{-1}$, and according to $^1$H-NMR its existent amount was 0.72 mol%. Therefore, a total unsaturated group content/divinylbenzene unit content molar ratio was 7.55.

(2) Preparation of a graft copolymer (II)

The same procedure as in Example 1-(2)-(ii) was carried out except that in Example 1-(2)-(ii), 1 g of the copolymer (I) prepared in the above-mentioned (1) was used as the copolymer (I), to prepare a graft copolymer (II), whereby 7.2 g of the white polymer was obtained.

The weight ratio of the copolymer (I) to the graft copolymer (II) was 1:16.2. Furthermore, the weight-average molecular weight (Mw) of the graft copolymer (II) was 123,000, and a molecular weight distribution (Mw/Mn) was 8.5, and the distribution of the molecular weight was in the form of a single peak. Moreover, the reduced viscosity of the copolymer measured at a temperature of 135° C. and a concentration of 0.2 g/dl in decalin was 2.83 dl/g.

(3) Evaluation of the graft copolymer (II)

The same procedure as in Example 1-(3) was carried out. The results are shown in Table 1.

EXAMPLE 4

(1) Preparation of tri-n-butylammonium tetrakis(pentafluorophenyl)borate

Pentafluorophenyllithium prepared from bromopentafluforobenzene (152 mmols) and butyllithium (152 mmols) was reacted with 45 mmols of boron trichloride in hexane to obtain tris(pentafluorophenyl)boron in the form of a white solid. Next, 41 mmols of this tris(pentafluorophenyl)boron was reacted with 41 mmols of pentafluorophenyllithium to obtain lithiumtetrakis(pentafluorophenyl)boron in the form of a white solid.

Next, 16 mmols of lithiumtetrakis(pentafluorophenyl)boric acid was reacted with 16 mmols of tri-n-butylammonium hydrochloride in water to obtain 12.8 mmols of tri-n-butylammonium tetrakis(pentafluorophenyl)borate in the form of a white solid.

(2) Preparation of a graft copolymer (II)

1 g of the copolymer (I) prepared in Example 1-(2)-(i) was dissolved in 80 ml of toluene, and nitrogen bubbling was then carried out for 20 minutes. Next, to this solution were added 8 ml of 1-octene, 0.5 mmol of triisobutylaluminum, 6 micromols of tri-n-butylammonium tetrakis(pentafluorophenyl)borate prepared in the abovementioned (1) and 2 micromols of dicyclopentadienyl-zirconium dichloride, followed by heating the solution up to 70° C. Next, an ethylene pressure of 3 kg/cm$^2$G was applied thereto to start graft copolymerization, and reaction was carried out for 30 minutes while the pressure was constantly maintained.

The amount of the obtained graft copolymer (II) was 13 g, and the weight ratio of the copolymer (I) to the graft copolymer (II) was 1:12. The 1-octene unit content of this graft copolymer (II) was 1.8 mol%, and the reduced viscosity of the copolymer measured at a temperature of 135° C. and a concentration of 0.2 g/dl in decalin was 1.53 dl/g.

(3) Evaluation of the graft copolymer (II)

The same procedure as in Example 1-(3) was carried out. The results are shown in Table 1.

EXAMPLE 5

(1) Preparation of a copolymer (I)

In a 1-liter stainless steel pressure autoclave were placed 600 ml of toluene, 2 ml of 1-octene, 2 mmols of norbornadiene, 2 mmols of triisobutylaluminum and 4 mmols of methylaluminoxane prepared in Example 1-(1), followed by heating the solution up to 85° C. Next, an ethylene pressure of 0.5 kg/cm$^2$G was applied thereto to saturate the solution with ethylene, and 4 micromols of dicyclopentadienylzirconium dichloride was then added thereto to start copolymerization, and while the ethylene pressure was maintained at 0.5 kg/cm$^2$G, the polymerization was carried out for 30 minutes. After the completion of the reaction, the solution was poured into methanol, followed by filtration, to collect a copolymer (I). Next, vacuum drying was carried out at 40° C. for 8 hours to obtain 1.1 g of the copolymer (I).

The weight-average molecular weight (Mw) and the molecular weight distribution (Mw/Mn) of this copolymer (I) were 28,500 and 3.4, respectively. The content of a norbornadiene unit measured by NMR was 0.36 mol%, and the content of an unsaturated group derived from a norbornadiene residue observed at 963 cm$^{-1}$ on an infrared absorption spectrum was 0.19 mol%. Furthermore, the absorption based on a vinyl group at the terminal of a molecular chain at 907 cm$^{-1}$ on the infrared absorption spectrum was observed, and its content was 0.53 mol%. Therefore, a total unsaturated group content/norbornadiene unit content (molar ratio) was 2.0.

(2) Preparation of a graft copolymer (II)

In a 1-liter stainless steel pressure autoclave, 0.9 g of the copolymer (I) obtained in the above-mentioned (1) was dissolved in 600 ml of toluene, and toluene was distilled off under reduced pressure at 70° C. for 60 minutes and then 400 ml of toluene was newly added thereto. Next, 20 ml of 1-octene, 1 mmol of triisobutylaluminum and 2 mmols of methylaluminoxane prepared in Example 1-(1) were added thereto, followed by heating the solution up to 85° C. Next, an ethylene pressure of 5 kg/cm$^2$G was applied thereto to saturate the solution with ethylene, and 2 micromols of dicyclopentadienylzirconium dichloride was then added thereto to start copolymerization, and while the ethylene pressure was maintained at 5 kg/cm$^2$G, the polymerization was carried out for 60 minutes. After the completion of the reaction, the solution was poured into methanol, followed by filtration to collect a copolymer (II). Next, vacuum drying was carried out at 80° C. for 4 hours to obtain 73.5 g of the graft copolymer (II).

The weight ratio of the yield of the copolymer (I) to that of the graft copolymer (II) was 1:82. The weight-average molecular weight (Mw) and the molecular weight distribution (Mw/Mn) of this copolymer (II) were 115,600 and 3.2, respectively, and this distribution was in the form of a single peak. Moreover, the reduced viscosity of the copolymer measured under conditions of a temperature of 135° C. and a concentration of 0.2 g/dl in decalin was 1.81 dl/g.

(3) Evaluation of the graft copolymer (II)

The same procedure as in Example 1-(3) was carried out. The results are shown in Table 1.

TABLE 1

|  | Melting Point (Tm) (°C.) | Crystallization Enthalpy (ΔH) (J/g) | Density (g/cm³) |
| --- | --- | --- | --- |
| Example 2 | 135.2 | 208 | 0.962 |
| Example 3 | 133.2 | 200 | 0.958 |
| Example 4 | 114.0 | 123 | 0.920 |
| Example 5 | 121.2 | 120 | 0.931 |

|  | Activation Energy (Ea) of Melt Fluidization (kcal/mol) | Thermal Stability (°C.) |
| --- | --- | --- |
| Example 2 | 9.6 | 337 |
| Example 3 | 9.2 | 330 |
| Example 4 | 9.8 | 325 |
| Example 5 | 15.8 | 340 |

EXAMPLE 6

Dimethylsilylenebis(2,4-dimethylcyclopentadienyl)zirconium dichloride (its structure had already been confirmed by $^1$H-NMR) prepared by a usual method was used to carry out the polymerization of propylene.

In a 1-liter reactor equipped with a stirrer were placed 400 ml of toluene, 4 micromols of dimethylsilylenebis(2,4-dimethylcyclopentadienyl)zirconium dichloride, 2 mmols of trisiobutylaluminum, 4 mmols of methylaluminoxane prepared in Example 1-(1) and 4 mmols of norbornadiene, and polymerization was then carried out at 30° C. for 90 minutes under a propylene pressure of 7.0 kg/cm$^2$G. After the completion of the reaction, an unreacted gas was removed, and the polymer was washed with acidic methanol, sufficiently washed with methanol, and then dried to obtain 62.5 g of the polymer.

In this polymer, the content of a norbornadiene unit was 0.57 mol%, and a total unsaturated group content/norbornadiene unit content (molar ratio) was 5.97. Furthermore, as a result of GPC measurement, the weight-average molecular weight (Mw) and the molecular weight distribution (Mw/Mn) of the polymer were 183,000 and 3.2, respectively, and the reduced viscosity of the polymer measured under conditions of a temperature of 135° C. and a concentration of 0.2 g/dl in decalin was 3.15 dl/g. Additionally, in the polymer, a melting point (Tm) was 158.9° C., a crystallization enthalpy (ΔH) was 82.6 J/g, and the activation energy (Ea) of melt fluidization was 19.5 kcal/mol.

EXAMPLE 7

10 g of anhydrous magnesium chloride was mixed with 1.9 ml of a toluene solution containing 0.38 g of triisobutylaluminum, and the mixture was then placed in a vibration mill (the internal volume of a pot=1,000 ml, SUS balls having a diameter of 12.7 mm=2 kg), and they were ground together for 17 hours. Furthermore, 2.2 g of tri-n-butylammonium tetrakis(pentafluorophenyl)borate prepared in Example 4-(1) and 0.95 g of dimethylsilylenebis(2,4-dimethylcyclopentadienyl)zirconium dichloride used in Example 6 were placed in the vibration mill, and they were then ground together for 4 hours.

200 mg of the above-mentioned ground material was dispersed in 100 ml of hexane, and 0.46 g of triisobutylaluminum was then added thereto. After stirring at room temperature for 17 hours, a supernatant liquid was removed, and the material was washed with 100 ml of hexane to prepare a solid catalyst.

Next, in a 1-liter reactor equipped with a stirrer were placed 400 ml of toluene, 25 mg of the above-mentioned solid catalyst and 5 mmols of norbornadiene, and polymerization was then carried out at 40° C. under a propylene pressure of 8 kg/cm$^2$G. After the completion of the reaction, unreacted propylene was removed, and the resultant polymer was taken out and then dried to obtain 92.5 g of the polymer.

In this polymer, the content of a norbornadiene unit was 0.61 mol%, and a total unsaturated group content/norbornadiene unit content (molar ratio) was 3.40. Furthermore, as a result of GPC measurement, the weight-average molecular weight (Mw) and the molecular weight distribution (Mw/Mn) of this polymer were 136,420 and 2.70, respectively, and the reduced viscosity of the polymer measured under conditions of a temperature of 135° C. and a concentration of 0.2 g/dl in decalin was 2.08 dl/g. Additionally, in the polymer, a melting point (Tm) was 158.6° C., a crystallization enthalpy (ΔH) was 71.9 J/g, and the activation energy (Ea) of melt fluidization was 17.9 kcal/mol.

Comparative Example 1

The same procedure as in Example 8 was carried out except that any norbornadiene was not used, to obtain 89.7 g of a polymer.

As a result of GPC measurement, this polymer had a weight-average molecular weight (Mw) of 88,000, a molecular weight distribution (Mw/Mn) of 2.02, a melting point (Tm) of 159.3° C. and a crystallization enthalpy (ΔH) of 105.4 J/g. In addition, the reduced viscosity of the polymer measured under conditions of a temperature of 135° C. and a concentration of 0.2 g/dl in decalin was 1.64 dl/g, and the activation energy (Ea) of melt fluidization was 8.6 kcal/mol.

EXAMPLE 8

(1) Preparation of a copolymer (I)

In a 1-liter stainless steel pressure autoclave were placed 600 ml of toluene, 80 mmols of p-(3-butenyl)styrene, 0.5 mmol of triisobutylaluminum, 2 mmols of methylaluminoxane prepared in Example 1-(1) and 2 micromols of dicyclopentadienylzirconium dichloride, followed by heating the solution up to 70° C. Afterward, propylene was introduced at 3 kg/cm$^2$G, and ethylene was further continuously introduced at 3 kg/cm$^2$G to carry out polymerization for 60 minutes. After the completion of the polymerization, the reaction system was cooled and the pressure was released, and the resultant copolymer (I) was precipitated again in a large amount of methanol and then collected by filtration. Next, vacuum drying was carried out at 50° C. for 10 hours to obtain 105 g of the copolymer (I).

(2) Evaluation of the graft copolymer (I)

In the copolymer (I), a melt flow rate (MFR) measured under conditions of a temperature of 190° C. and a load of 2.16 kg was 14.5 g/10 minutes, and the reduced viscosity of the copolymer measured under conditions of a temperature of 135° C. and a concentration of 0.2 g/dl in decalin was 1.10 dl/g. As a result of GPC measurement, the weight-average molecular weight (Mw) and the molecular weight distribution (Mw/Mn) of this copolymer were 49,600 and 4.1, respectively.

Furthermore, on the infrared absorption spectrum (IR) of this copolymer (I), absorptions attributable to a terminal vinylidene group and a terminal vinyl group were observed at about 888 $cm^{-1}$ and about 907 $cm^{-1}$, respectively, and in addition, an absorption attributable to a butenyl residue of p-(3-butenyl)styrene was observed at about 1,680 $cm^{-1}$. The contents of the comonomer units were calculated from the absorbances of the respective peaks, and as a result, the content of the propylene unit was 18.8 mol% and that of the p-(3-butenyl)styrene unit was 0.16 mol%. The total amount of unsaturated groups measured by the IR spectrum was 0.32 mol%, and so a total unsaturated group content/diolefin unit content (molar ratio) was 2.0.

(3) Preparation of a copolymer (III)

In a 1-liter stainless steel pressure autoclave, 20 g of the copolymer (I) was dissolved in 600 ml of toluene at 70° C., and 0.25 mmol of triisobutylaluminum, 1 mmol of methylaluminoxane and 0.5 micromol of dicyclopentadienyl-zirconium dichloride were added thereto. Afterward, hydrogen was introduced at 3 kg/$cm^2$G to carry out a hydrogenation reaction for 180 minutes. After the completion of the reaction, the reaction system was cooled and the pressure was released, and the resultant copolymer (III) was precipitated again in a large amount of methanol and then collected by filtration. Next, vacuum drying was carried out at 80° C. for 10 hours to obtain 19.8 g of the copolymer (III).

(4) Evaluation of the graft copolymer (III)

In the copolymer (III), a melt flow rate (MFR) measured under conditions of a temperature of 190° C. and a load of 2.16 kg was 12.4 g/10 min, and the reduced viscosity of the copolymer measured under conditions of a temperature of 135° C. and a concentration of 0.2 g/dl in decalin was 1.21 dl/g.

The weight-average molecular weight (Mw) and the molecular weight distribution (Mw/Mn) of this copolymer (III) were measured, and as a result, Mw=49,500 and Mw/Mn =4.2, and hence the Mw and the Mw/Mn of the copolymer (III) were substantially the same as in the copolymer (I).

However, on an infrared absorption spectrum (IR) of this copolymer (III), any absorptions attributable to a terminal vinylidene group at about 888 $cm^{-1}$ a terminal vinyl group at about 907 $cm^{-1}$ and a butenyl residue at about 1,680 $cm^{-1}$ were not observed. On the other hand, the intensity of the absorption peak attributable to the benzene ring of p-(3-butenyl)styrene seen at about 1,512 $cm^{-1}$ was scarcely different from the spectrum of the copolymer (I), and the content of a p-(3-butenyl)styrene unit was 0.16 mol%.

In addition, the thermal stability of the copolymer (III) was measured by the use of the undermentioned device and conditions, when a melt viscosity 80 minutes after the start of the measurement was represented by $\eta^*$ and a melt viscosity at the start of the measurement was represented by $\eta^*_i$, $B=(\eta^*-\eta^*_i)/\eta^*_i \times 100 = 2.3$.

Incidentally, B of the copolymer (I) which did not undergo the hydrogenation was 29.2.

[Measurement procedure of thermal stability]

A capilograph made by Toyo Seiki Works Co., Ltd. (capillary:length=10 mm, diameter=1 mm and a barrel diameter=9.6 mm) was used, and measurement was made under conditions of a measurement temperature in air of 190° C., an extrusion rate of 2 mm/min and a shear rate of 24.3 $sec^{-1}$.

About 15 g of a powdery sample was put in a barrel heated up to 190° C., and the sample was then preheated for 15 minutes to melt the sample. Afterward, a certain load was applied to the sample so that the extrusion rate might be constant, and after 10 minutes had elapsed to make an extrusion state stable, the measurement of a melt viscosity was started. The melt viscosity at this time was represented by $\eta^*_i$ and the melt viscosity 80 minutes after the start of the measurement was represented by $\eta^*$.

EXAMPLE 9

(1) Preparation of copolymers (I), (II)

In a 1-liter stainless steel pressure autoclave were placed 600 ml of toluene, 20 ml of 1-octene, 10 mmols of 1,5-hexadiene, 2 mmols of triisobutylaluminum, 4 mmols of methylaluminoxane prepared in Example 1-(1) and 4 micromols of dicyclopentadienylzirconium dichloride, followed by heating the solution up to 85° C. Afterward, ethylene was continuously introduced at 5 kg/$cm^2$G to carry out polymerization for 60 minutes. After the completion of the polymerization, the pressure in the reaction system was released, and the resultant copolymer was precipitated again in a large amount of methanol and then collected by filtration. Next, vacuum drying was carried out at 50° C. for 10 hours to obtain 87 g of the copolymer (I).

Hydrogen was introduced, at 3 kg/$cm^2$G, into the copolymer obtained under the above-mentioned conditions, and a hydrogenation reaction was then performed at 85° C. for 120 minutes. At this time, the fresh catalyst component was not added. After the completion of the reaction, the reaction system was cooled and the pressure was released, and the resultant copolymer (III) was precipitated again in a large amount of methanol and then collected by filtration. Next, vacuum drying was carried out at 80° C. for 10 hours to obtain 89 g of the copolymer (III).

(2) Evaluation of the graft copolymer (I)

In the copolymer (I), a melt flow rate (MFR) measured under conditions of a temperature of 190° C. and a load of 2.16 kg was 1.15 g/10 min, and the reduced viscosity of the copolymer measured under conditions of a temperature of 135° C. and a concentration of 0.2 g/dl in decalin was 1.68 dl/g.

The weight-average molecular weight (Mw) and the molecular weight distribution (Mw/Mn) of this copolymer (I) were measured, and as a result, Mw=111,700 and Mw/Mn=2.9.

Furthermore, on the infrared absorption spectrum (IR) of this copolymer (I), absorptions attributable to a terminal vinylidene group and a terminal vinyl group were observed at about 888 $cm^{-1}$ and about 907 $cm^{-1}$ respectively, and also on a proton NMR spectrum, peaks attributable to unsaturated groups were observed at 5 to 6 ppm.

The content of a 1,5-hexadiene unit was 1.4 mol%, and the total amount of the unsaturated groups measured by the IR spectrum was 0.09 mol%. Therefore, a total unsaturated group content/diolefin unit content (molar ratio) was 0.064.

(3) Evaluation of the copolymer (III)

In the copolymer (III), a melt flow rate (MFR) measured under conditions of a temperature of 190° C. and a load of 2.16 kg was 1.09 g/10 min, and the reduced viscosity of the copolymer measured under conditions of a temperature of 135° C. and a concentration of 0.2 g/dl in decalin was 1.70 dl/g.

The weight-average molecular weight (Mw) and the molecular weight distribution (Mw/Mn) of this copolymer (III) were measured, and as a result, Mw=120,800 and Mw/Mn=3.0.

On an IR spectrum and a proton NMR spectrum of this copolymer (III), any peak attributable to an unsaturated group was not observed. In addition, a 1,5-hexadiene unit content was 1.4 mol%, as in the case of the copolymer (I).

Furthermore, the thermal stability of the copolymer (III) was measured in the same manner as in Example 9-(4), and as a result, $(\eta^* - \eta^*_i)/\eta^*_i \times 100 = -0.98$.

On the other hand, the thermal stability of the copolymer (I) was similarly measured, and as a result, a melt viscosity increased with time and in consequence, $(\eta^* - \eta^*_i)/\eta^*_i \times 100 = 20.8$.

Possibility of Industrial Utilization

According to the present invention, an olefin copolymer can be obtained which can optionally control the activation energy of melt fluidization and in which high-speed molding is possible to lower a working cost and a high-speed film formation is possible by the control of a molecular weight distribution and which has an excellent thermal stability, transparency and uniformity. In consequence, a high-performance VLDPE, LDPE, L-LDPE and HDPE can be easily obtained, and a novel branched propylene polymer and a novel olefin elastomer can also be obtained.

In particular, the olefin copolymer of the present invention which has been subjected to a hydrogenation treatment is substantially free from an unsaturated group, is excellent in thermal stability, and can inhibit the generation of a gel in blow molding and film formation, and so this kind of olefin copolymer is suitable for high-temperature molding.

In addition, the olefin copolymer of the present invention is also useful as a compatibilizing agent for other thermoplastic resins.

We claim:

1. An olefin graft copolymer prepared by the graft polymerization of an olefin copolymer and an olefin, wherein said olefin copolymer comprises a unit (1) which is at least one member selected from the group consisting of ethylene, α-olefins having 3 to 20 carbon atoms and cyclic olefins and a unit (2) which is a diolefin and in which a weight-average molecular weight is in the range of 200 to 800,000, the content of the diolefin unit is in the range of 0.002 to 30 mol%, and a relation between the content of the diolefin unit (DOU mol%) and the total content of unsaturated groups observed in a molecular chain (TUS mol%) meets the formula 0.001<TUS/DOU<200.

2. The olefin graft copolymer according to claim 2, wherein unit (1) is ethylene and the content of said unit (1) is in the range of 85 to 99.99 mol%, a density is in the range of 0.86 to 0.97 g/cm³, and the activation energy (Ea) of melt fluidization is in the range of 6 to 20 kcal/mol.

3. A process for preparing the olefin graft copolymer described in claim 1 which comprises the steps of copolymerizing at least one member selected from the group consisting of ethylene, α-olefins having 3 to 20 carbon atoms and cyclic olefins and a diolefin in the presence of a polymerization catalyst containing, as main components, (A) a transition metal compound and (B) a compound capable of reacting with the transition metal compound of the component (A) to form an ionic complex, whereby an olefin copolymer is formed, and then further graft-polymerizing the copolymer and an olefin in the presence of the polymerization catalyst.

4. The olefin graft copolymer according to claim 1, wherein a melt flow rate (MFR) measured under conditions of a temperature of 190° C. and a load of 2.16 kg is in the range of 0.001 to 2,000 g/10 min, or the reduced viscosity of the copolymer measured under conditions of a temperature of 135° C. and a concentration of 0.2 g/dl in declain is in the range of 0.05 to 20 dl/g.

5. The olefin graft copolymer of claim 1, wherein unit (1) is propylene and the content of said unit (1) is in the range of 85 to 99.99 mol.%, and the activation energy (Ea) of melt fluidization is in the range of 12 to 27 kcal.mol.

6. The preparation process according to claim 3, wherein the diolefin is at least one polyfunctional monomer selected from the group consisting of cyclic diene compounds and compounds obtained from at least two similar or different kinds of residues selected from the group consisting of an α-olefin residue, a styrene residue and a cyclic olefin residue.

7. The process for preparing a substantially unsaturated group-free olefin graft copolymer prepared by hydrogenating the olefin graft copolymer described in claim 1, wherein the olefin graft copolymer obtained by a process comprising copolymerizing at least one member selected from the group consisting of ethylene, α-olefins having 3 to 20 carbon atoms and cyclic olefins and a diolefin in the presence of a polymerization catalyst containing, as main components, (A) a transition metal compound and (B) a compound capable of reacting with the transition metal compound of the component (A) to form an ionic complex, wherein an olefin copolymer is formed, and then further graft-polymerizing the copolymer and an olefin in the presence of the polymerization catalyst, is hydrogenated in the presence of the hydrogenation catalyst.

8. The process according to claim 7, wherein the copolymer obtained by the polymerization in the presence of the polymerization catalyst is hydrogenation in the presence of the hydrogenation catalyst without newly adding the hydrogenation catalyst component.

9. The preparation process according to claim 7, wherein the diolefin is at least one polyfunctional monomer selected from the group consisting of cyclic diene compounds and compounds obtained from at least two similar or different kinds of residues selected from the group consisting of an α-olefin residue, a styrene residue and a cyclic olefin residue.

* * * * *